US012777292B2

(12) United States Patent
Burwinkel et al.

(10) Patent No.: US 12,777,292 B2
(45) Date of Patent: Oct. 27, 2026

(54) HEARING INSTRUMENT PROCESSING MODE SELECTION

(71) Applicant: Starkey Laboratories, Inc., Eden Prairie, MN (US)

(72) Inventors: Justin Burwinkel, Eden Prairie, MN (US); Kenneth Jensen, Brunswick, MD (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 112 days.

(21) Appl. No.: 18/583,480

(22) Filed: Feb. 21, 2024

(65) Prior Publication Data

US 2024/0292160 A1 Aug. 29, 2024

Related U.S. Application Data

(60) Provisional application No. 63/486,811, filed on Feb. 24, 2023.

(51) Int. Cl.

*H04R 25/00* (2006.01)
*H04R 1/10* (2006.01)

(52) U.S. Cl.

CPC ........... *H04R 25/50* (2013.01); *H04R 1/1083* (2013.01); *H04R 25/43* (2013.01); *H04R 2225/43* (2013.01); *H04R 2225/55* (2013.01)

(58) Field of Classification Search

CPC ...... H04R 25/50; H04R 25/43; H04R 1/1083; H04R 2225/43; H04R 2225/55

See application file for complete search history.

(56) References Cited

U.S. PATENT DOCUMENTS

| | | | |
|---|---|---|---|
| 7,106,870 | B2 | 9/2006 | Meier et al. |
| 7,269,269 | B2 | 9/2007 | Hamacher et al. |
| 8,605,923 | B2 | 12/2013 | Goorevich et al. |

(Continued)

FOREIGN PATENT DOCUMENTS

| | | | |
|---|---|---|---|
| EP | 3934279 | A1 | 1/2022 |
| WO | 2017118477 | A1 | 7/2017 |
| WO | 2021148538 | A1 | 7/2021 |

OTHER PUBLICATIONS

Extended Search Report from counterpart European Application No. 24159517.2 dated Jun. 25, 2024, 9 pp.

(Continued)

*Primary Examiner* — Suhan Ni
(74) *Attorney, Agent, or Firm* — Shumaker & Sieffert, P.A.

(57) ABSTRACT

A system including one or more hearing instruments configured to be worn in, on, or about an ear of a user. The system is configured to: determine that the user may prefer either of a first or a second processing mode; apply the first processing mode and the second processing mode to generate a first output audio signal and a second output audio signal; cause one or more hearing instruments to output sound based on the first output audio signal or the second output audio signal; receive an indication of user input that identifies a selected output audio signal from among the first output audio signal and the second output audio signal; and apply a selected processing mode corresponding to the selected output audio signal to generate a third output audio signal; and cause the one or more hearing instruments to output sound based on the third output audio signal.

20 Claims, 6 Drawing Sheets

(56) References Cited

U.S. PATENT DOCUMENTS

| | | | | |
|---|---|---|---|---|
| 8,958,586 | B2 | 2/2015 | Preves | |
| 10,271,149 | B2 | 4/2019 | Solum et al. | |
| 11,304,013 | B2 | 4/2022 | Burwinkel et al. | |
| 2005/0129262 | A1 | 6/2005 | Dillon et al. | |
| 2008/0192969 | A1 | 8/2008 | Welner | |
| 2017/0064470 | A1 | 3/2017 | Popovac et al. | |
| 2019/0182606 | A1* | 6/2019 | Petersen | H04R 25/50 |
| 2020/0296521 | A1* | 9/2020 | Wexler | H04R 25/405 |
| 2021/0099813 | A1* | 4/2021 | Spieler | H04R 25/554 |
| 2022/0279290 | A1 | 9/2022 | Mckinney et al. | |
| 2023/0247373 | A1 | 8/2023 | Burwinkel | |

OTHER PUBLICATIONS

Response to Extended Search Report dated Jun. 25, 2024, from counterpart European Application No. 24159517.2 filed Feb. 12, 2025, 18 pp.

Communication pursuant to Article 94(3) EPC from counterpart European Application No. 24159517.2 dated Apr. 7, 2026, 9 pp.

Response to Communication pursuant to Article 94(3) EPC dated Apr. 7, 2026, from counterpart European Application No. 24159517.2 filed Aug. 5, 2026, 17 pp.

* cited by examiner

HEARING INSTRUMENT PROCESSING MODE SELECTION

This application claims the benefit of U.S. provisional patent application 63/486,811 filed Feb. 24, 2023, the entire content of which is incorporated by reference.

TECHNICAL FIELD

This disclosure relates to ear-wearable devices.

BACKGROUND

A user may use one or more ear-wearable devices for various purposes. For example, a user may use hearing instruments to enhance the user's ability to hear sound from a surrounding environment. In another example, a user may use hearing instruments to listen to media, such as music or television. Hearing instruments may include hearing aids, earbuds, headphones, earphones, personal sound amplifiers, cochlear implants, brainstem implants, osseointegrated hearing instruments, or the like. A typical ear-wearable device includes one or more audio sources including microphone(s) and/or telecoil(s). The ear-wearable device may generate an audio signal representing a mix of sounds received by the one or more audio sources and produce a modified version of the received sound based on the audio signal. The modified version of the received sound may be different from the received sound.

SUMMARY

This disclosure describes techniques for switching operating modes of hearing instruments. A user may wear one or more hearing instruments in, on, or about an ear of the user. Hearing instruments may include, but are not limited to, hearing aids, earbuds, headphones, headphones, personal sound amplifiers, cochlear implants, brainstem implants, or osseointegrated hearing instruments. Hearing instruments may include one or more sources configured to receive sound from an external source (e.g., from an environment around the user, from one or more computing systems, devices, and/or cloud computing environments) and output the received sound or a modified version of the received sound to the user. A processing system within the hearing instruments and/or connected to the hearing instruments may apply a processing mode to produce a modified version of the received sound. The modified version of the received sound may be a mix of input audio signals from two or more sources of the hearing instruments (e.g., from a microphone and a telecoil).

The user may wish to apply a different processing mode based on the environment surrounding the user, based on contextual information, or the like. For example, a user may wish to apply a processing mode to the input audio signals to enhance speech intelligibility, reduce noise, and/or perform one or more other functions. The examples in this disclosure describe devices, systems, and methods configured to select a plurality of different processing modes based on the environmental and/or contextual information, output sounds to the user based on the plurality of different processing modes, receive a user selection indicating a preferred processing mode from the plurality of processing modes, and cause the hearing instruments to output a modified version of the received sound based on the preferred processing mode. The user may then select a desired processing mode based on the different sounds and the hearing instrument may output a modified version of the received sound to the user based on the desired processing mode. The devices, systems, and methods may include reception of the user input via the hearing instruments. In some examples, hearing instruments may automatically switch between different processing modes which may lead to user discomfort, e.g., due to sudden changes in the sound outputted from the hearing instruments, or increased user frustration, e.g., due to non-preferred processing modes being automatically applied. The systems, devices, and methods described in this disclosure may provide the ability to provide the user with different processing modes for hearing instruments and with the ability to switch between the different processing modes without causing user discomfort. In some examples, the systems, devices, and methods described in this disclosure may allow the user to switch between different processing modes without requiring additional computing devices and/or computing systems.

In one example, this disclosure describes a system comprising: one or more hearing instruments configured to be worn in, on, or about an ear of a user; and a processing system configured to: determine that a current acoustic environment of the one or more hearing instruments is an acoustic environment in which the user may prefer either of a first processing mode and a second processing mode; and based on the determination: apply the first processing mode to generate a first output audio signal; apply the second processing mode to generate a second output audio signal; cause at least one of the one or more hearing instruments to output sound based on the first output audio signal; after causing the one or more hearing instruments to output the first output audio signal, cause at least one of the one or more hearing instruments to output sound based on the second output audio signal; receive an indication of user input that identifies a selected output audio signal from among the first output audio signal and the second output audio signal, wherein a selected processing mode from among the first and second processing modes was applied to generate the selected output audio signal; and based on receiving the indication of user input that identifies the selected output audio signal: apply the selected processing mode to generate a third output audio signal; and cause the one or more hearing instruments to output sound based on the third output audio signal.

In some examples, this disclosure describes a system comprising: a first hearing instrument configured to be worn in, on, or about a first ear of a user; a second hearing instrument configured to be worn in, on, or about a second ear of the user; and a processing system configured to: determine that a current acoustic environment of the first hearing instrument and the second hearing instrument is an acoustic environment in which the user may prefer either of a first processing mode and a second processing mode; and based on the determination: apply the first processing mode to generate a first output audio signal; apply the second processing mode to generate a second output audio signal; cause the first hearing instrument to output sound based on the first output audio signal and the second hearing instrument to output sound based on the second output audio signal; receive an indication of user input that identifies a selected output audio signal from among the first output audio signal and the second output audio signal; wherein a selected processing mode from among the first and second processing modes was applied to generate the selected output audio signal; and based on receiving the indication of user input that identifies the selected output audio signal: apply the selected processing mode to generate a third output audio signal; and cause both the first hearing instrument and the second instrument to output sound based on the third output audio signal.

In some examples, this disclosure describes a method comprising: determining, by a processing system, that a current acoustic environment of one or more hearing instruments is an acoustic environment in which a user may prefer either of a first processing mode and a second processing mode, wherein the one or more hearing instruments is configured to be worn in, on, or about an ear of the user; and based on the determination: applying, by the processing system, the first processing mode to generate a first output audio signal; applying, by the processing system, the second processing mode to generate a second output audio signal; outputting, via at least one of the one or more hearing instruments, sound based on the first output audio signal; after outputting the first output audio signal, outputting, via at least one of the one or more hearing instruments to output sound based on the second output audio signal; receiving, by the processing system, an indication of user input that identifies a selected output audio signal from among the first output audio signal and the second output audio signal, wherein a selected processing mode from among the first and second processing modes was applied to generate the selected output audio signal; and based on receiving the indication of user input that identifies the selected output audio signal: applying, by the processing system, the selected processing mode to generate a third output audio signal; and outputting, by the one or more hearing instruments, sound based on the third output audio signal.

A computer-readable medium comprising instructions that, when executed, cause a processing system of a hearing instrument system to determine that a current acoustic environment of one or more hearing instruments is an acoustic environment in which a user may prefer either of a first processing mode and a second processing mode, wherein the one or more hearing instruments is configured to be worn in, on, or about an ear of the user; and based on the determination: apply the first processing mode to generate a first output audio signal; apply the second processing mode to generate a second output audio signal; output, via at least one of the one or more hearing instruments, sound based on the first output audio signal; after outputting the first output audio signal, output, via at least one of the one or more hearing instruments to output sound based on the second output audio signal; receive, by the processing system, an indication of user input that identifies a selected output audio signal from among the first output audio signal and the second output audio signal, wherein a selected processing mode from among the first and second processing modes was applied to generate the selected output audio signal; and based on receiving the indication of user input that identifies the selected output audio signal: apply the selected processing mode to generate a third output audio signal; and output, by the one or more hearing instruments, sound based on the third output audio signal.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
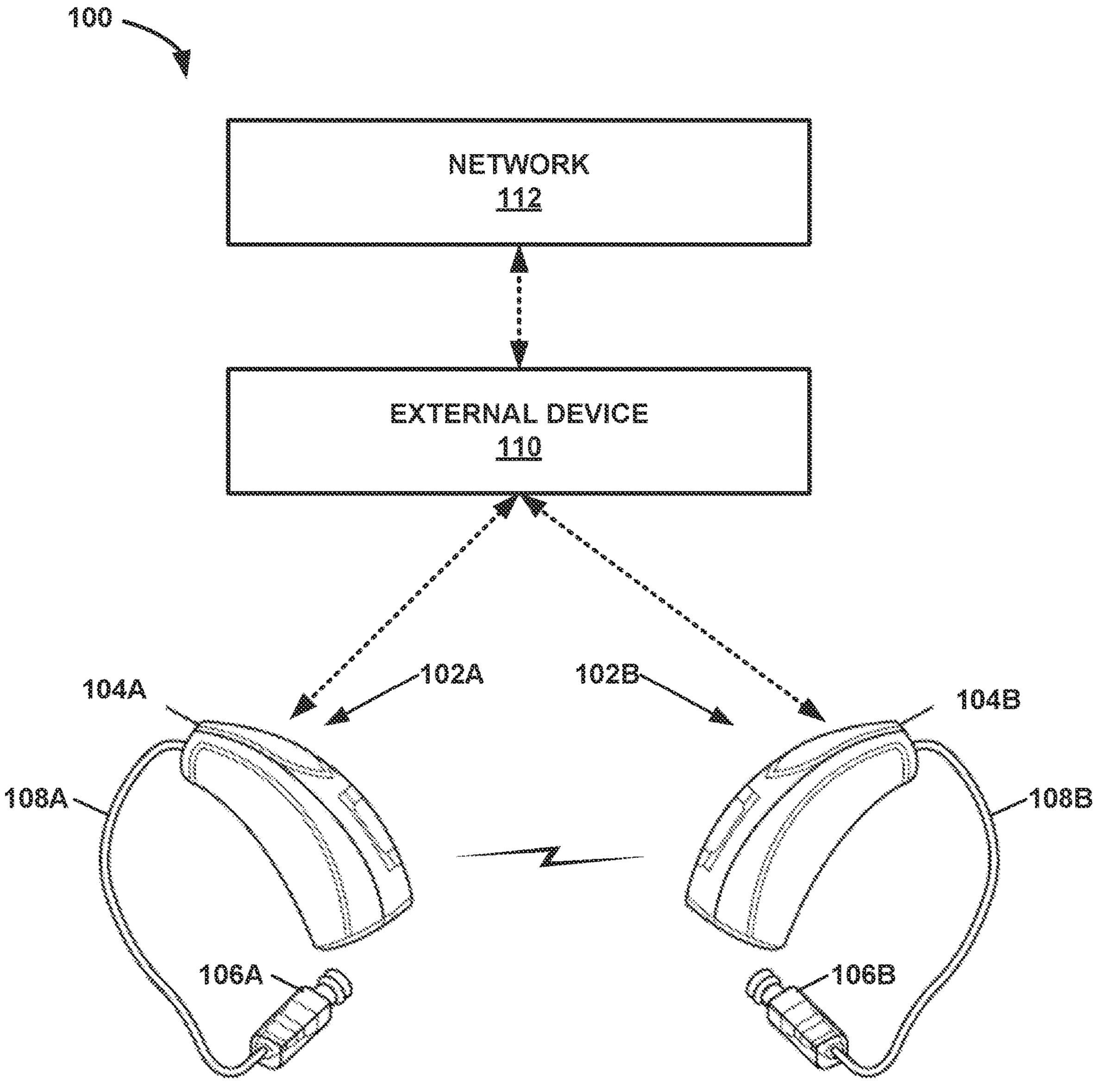
FIG. 1 illustrates an example hearing instrument system, in accordance with one or more techniques of this disclosure.

A user may use one or more hearing instruments to enhance, reduce, or modify sounds in an acoustic environment surrounding the user. Hearing instruments may be worn in, on, or about the ears of the user. Hearing instruments may include, but are not limited to, hearing aid, earbuds, headphones, earphones, personal sound amplifiers, cochlear implants, brainstem implants, osseointegrated hearing instruments, or the like. In some examples, the user may wear a first hearing instrument around one ear and a second hearing instrument around another ear. Each of the first hearing instrument and the second hearing instrument may output a same sound or a different sound.

A hearing instrument system may receive sounds or sound data from an acoustic environment surrounding the user via one or more acoustic (e.g., microphone(s)), magnetic (e.g., telecoil(s)), or electromagnetic (e.g., electromagnetic radio (s)) sources of hearing instrument(s), e.g., in the form of input audio signals. The system may then convert the received sounds or sound data into input audio signals, apply a processing mode to the input audio signals to generate output audio signals, and cause the hearing instrument(s) to output sound to the user based on the output audio signals. In some examples, output audio signals may include a mix of input audio signals from two or more sources. In the various examples, the processing mode may determine a ratio of the different input audio signals in the output audio signals, additional processing for any of the input audio signals, or other instructions and/or parameters configured to modify the input audio signals. For example, an output audio signal including a mix of input audio signals from a telecoil and a microphone of a hearing instrument may only include audio signals from the telecoil, an even mix of audio signals from the telecoil and the microphone, only audio signals from the microphone, or any combination thereof. In an alternative example, an output audio signal including a mix of input audio signals received and/or demodulated from an electromatic radio and audio signals from a microphone of a hearing instrument may only include audio signals derived from the electromagnetic radio, an even mix of audio signals from the electromagnetic radio and the microphone, only audio signals from the microphone, or any combination thereof.

A hearing instrument system may process audio signals in one or more ways, using one or more predefined settings or operations of the hearing instrument. By way of example, the setting(s) may include, but is not limited to, one or more of amplification (gain) values at one or more frequencies (which can include bass/treble balance), microphone directionality algorithms or polar patterns, compression thresholds, speeds and knee points or ratios at one or more frequencies, delay settings at one or more frequencies, frequency shifting algorithms, noise reduction algorithms, speech enhancement algorithms, and the like. Any suitable noise reduction or speech enhancement method, process, algorithm, or machine learning may be used as part of a predefined setting of the hearing instrument. In some examples, settings can specifically be related to amplification (gain) values centered around frequencies corresponding to production of various speech sounds (see, e.g., TABLE 1 below).

TABLE 1

| Linguistic Speech Sound | Sound Frequency (Hz) |
|---|---|
| "mmm" | 250-500 |
| "ooo" | 700 (F1); 900 |
| "ajj" | 700 (F1); 1300 (F2) |
| "eee" | 300 (F1); 2500 (F2) |
| "shh" | 2000-4000 |
| "sss" | 3500-7000 |

As illustrated in Table 1, particular linguistic speech sounds may correspond to particular ranges of sound frequencies and may be used by a hearing instrument system, e.g., as described herein, to distinguish, identify, and/or amplify speech. As illustrated in FIG. 1, some of the speech sounds may correspond to different frequencies for different formants of the speech sound. Formants represent spectral peaks of the acoustic resonance of the vocal tract. Many speech sounds (e.g., vowels) may include a plurality of formants (e.g., first formant (F1), second formant (F2)). The hearing instrument system may determine the presence of a speech sound by identifying the presence of one or more formants. For example, the hearing instrument system may determine, based on identification of sounds with frequencies of 350 Hertz (Hz) and 900 Hz corresponding to F1 and F2 of "ooo", the presence of the "ooo" linguistic speech sound in the sound or sound signal.

Depending on contextual information (e.g., current acoustic environment of the user, intended use of the hearing instrument system by the user), the user may prefer the hearing instrument system to process any input audio signals with a particular processing mode over other processing modes. For example, the user may wish for the hearing instrument to prioritize speech intelligibility, to prioritize listening comfort (e.g., noise reduction/noise cancellation), or to prioritize other functions. It should be appreciated that a user may subjectively prioritize speech intelligibility, noise reduction/cancellation, or other functions based upon momentary judgments and/or listening intents that may not necessarily extend to all instances when the user is within the same acoustic environment. For example, the user may prioritize speech intelligibility in the acoustic environment in a first instance and prioritize noise reduction in the same acoustic environment in a second instance. Therefore, in some examples, it may be advantageous to intelligently present different processing mode options to the user, again, even when the user has previously provided input based on similar contextual information. The systems, devices, and methods described in this disclosure allows the hearing instrument system to offer different selections of available processing modes based on the contextual information (e.g., based on the current acoustic environment) and based on user selection, output sound to the user based on a selected processing mode. In some examples, the hearing instrument system may, based on the user's prior selections under similar contexts (e.g., in similar acoustic environments) output sound to the user based on a previously selected processing mode. The hearing instrument(s) of the hearing instrument system may include user interfaces and/or other components configured to receive the user selection.

The systems, devices, and methods described in this disclosure may provide several benefits over other hearing instrument systems. Some hearing instrument systems may automatically switch between different processing modes which may lead to increased user discomfort (e.g., due to relatively sudden changes in the outputted sound), or frustration, e.g., due to non-preferred processing modes being automatically applied. Changing processing modes based on user selection, as described in this disclosure, may reduce user discomfort/frustration and provide the user with improved control capabilities. The systems, devices, and methods described in this disclosure may also provide a user with a capacity to select relatively more specialized processing modes with greater specificity for particular intended uses and to rapidly switch between processing modes, including between the more specialized processing modes based on changes in the contextual information (e.g., changes in the acoustic environment, changes in intended use). Additionally, the systems, devices, and methods described in this disclosure may also allow the user to provide specific feedback to the hearing instrument system regarding the processing modes and make fine adjustments to the processing modes without requiring use of a smartphone, laptop, smartwatch, tablet, or any other computing device and/or computing system.

FIG. 1 illustrates an example hearing instrument system 100 (also referred to herein as "system 100"). System 100 includes a first hearing instrument 102A and a second hearing instrument 102B (collectively referred to as "hearing instruments 102"), external device 110, and network 112. Hearing instruments 102 may be wearable concurrently in different ears of the same user. In some examples, the user may only wear one of hearing instruments 102 at a time. In the example of FIG. 1, hearing instruments 102 are shown as receiver-in-canal (RIC) style hearing aids. Thus, in the example of FIG. 1, first hearing instrument 102A includes a receiver-in-the-canal (RIC) unit 104A, a receiver unit 106A, and a communication cable 108A communicatively coupling RIC unit 104A and receiver unit 106A. Similarly, hearing instrument 102B includes a RIC unit 104B, a receiver unit 106B, and a communication cable 108B communicatively coupling RIC unit 104B and receiver unit 106B. RIC units 104A and 104B may be collectively referred to as "RIC units 104" or "processing units 104," Receiver units 106A and 106B may be collectively referred to as "receiver units 106," and communication cables 108A and 108B may be collectively referred to as "communication cables 108". While the devices, systems, and methods of this disclosure are described primarily with reference to an RIC device (e.g., RIC units 104 of FIG. 1), the same techniques may be performed on other hearing instruments, computing systems and/or devices. For example, hearing instrument system 100 may include invisible-in-canal (IIC) devices, completely-in-canal (CIC) devices, in-the-canal (ITC) devices, in-the-ear (ITE), behind-the-ear (BTE) and other types of hearing instruments that reside within or about the user's ear. In instances where the techniques of this disclosure are implemented in IIC, CIC, ITC, or ITE devices, the functionality and components described in this disclosure with respect to RIC units 104 and receiver units 106 may be integrated into single enclosure.

It should be appreciated that hearing instruments 102 may form a Contralateral Routing of Signals (CROS) or a Bilateral Contralateral Routing of Signals (BiCROS) system wherein one of either hearing instrument 102A or hearing instrument 102B may primarily function to transmit audio from one ear to the opposite ear and, therefore, the audio transmitting device may lack a receiver unit and/or couple to the ear in a different manner than the receiving side device. In some examples, either hearing instrument 102A or hearing instrument 102B may function primarily to accept a user input or selection instead of transmitting, receiving, or processing audio input.

In the example of FIG. 1, first hearing instrument 102A may wirelessly communicate with second hearing instrument 102B and external device 110. In some examples, RIC units 104 include transmitters and receivers (e.g., transceivers) that support wireless communication between hearing instruments 102 and external device 110. In some examples, receiver units 106 include such transmitters and receivers (e.g., transceivers) that support wireless communication between hearing instruments 102 and external device 110. External device 110 may include a personal computer, a laptop, a tablet, a smartphone, a smartwatch, a cloud computer, a mesh network node, an internet gateway device, or the like.

Each of hearing instruments 102 may receive input audio signals from an environment surround the user, apply a processing mode to the input audio signals to generate output audio signals, and output a sound to the user based on the output audio signals. For example, each of RIC units 104 may receive sound from the environment in the form of input audio signals and generate the output audio signals based on the input audio signals and the processing mode. Each of receiver units 106 may then output the sound based on the output audio signals.

Each of hearing instruments 102 may apply any of a plurality of processing modes to the input audio signals to generate output audio signals. Each of hearing instruments 102 may communicate with another of hearing instruments 102, e.g., to cause hearing instruments 102 to apply a same processing mode or a different processing mode to the received input audio signals. Each of hearing instruments 102 may store information corresponding to the delivery of sound to the user including, but are not limited to, the input audio signals, the output audio signals, the processing mode applied to the input audio signals, the parameters of the applied processing mode, a setting label, time(s) when the input audio signals were received, time(s) when one or more processing mode(s) were applied to the input audio signals, or the like. Hearing instruments 102 may transmit the stored information to external device 110 and/or to network 112 through external device 110. In some examples, hearing instruments 102 may retrieve processing modes and/or parameters of processing mode from external device 110 or from network 112 (e.g., through external device 110). While FIG. 1 illustrates hearing instruments 102 communicating with network 112 through external device 110, hearing instruments 102 may directly communicate with network 112 and/or one or more other computing systems and/or devices.

External device 110 and/or one or more computing systems, computing devices and/or cloud computing environments connected to network 112 may determine a current acoustic environment and/or contextual information and select two or more possible processing modes from a plurality of processing modes. In some examples, hearing instruments 102 may perform the determinations without input from external device 110 and/or network 112. For example, external device 110 and/or a device connected to network 112 may select a processing mode that the user had previously indicated to be a preferred/default processing mode. In some examples, external device 110 and/or network 112 may determine, based on sensed signals, a current acoustic environment of the user (e.g., indoors, outdoors, in a vehicle, in an area with good or poor acoustic absorption properties) and/or contextual information in the current acoustic environment (e.g., person(s) speaking near the user, white noise near the user, disruptive noise near the user) and select processing modes based on the current acoustic environment, contextual information, and/or any other determinations made by external device 110 and/or network 112. The sensed signals may include input audio signals (e.g., from hearing instruments 102 and/or signals from one or more other sensor(s) in system 100 and/or in communication with system 100 via network 112. The other sensor(s) may include, but are not limited to, telecoil(s), electromagnetic radio(s), Global Positioning Systems (GPS) sensors, barometers, magnetometers, electroencephalogram (EEG) sensors, cameras, or inertial measurement units (IMUs). In some examples, the sensed signal may include a beacon signal from a beacon (e.g., a physical beacon, a virtual beacon) on or in communication with system 100. The beacon may provide environmental information and/or geolocation information to system 100. A physical beacon may include separate computing devices of or in communication with system 100 and may be configured to output wireless signals (e.g., the beacon signal) to one or more components of system 100 (e.g., to hearing instruments 102, to external device 110). A virtual beacon may be incorporated into an existing computing device and may be configured to output wireless signals via antennae and/or communications circuitry of the computing device. For example, external device 110 and/or another computing device of system 100 may be configured to output the beacon signal to hearing instruments 102 via a virtual beacon. In some examples, system 100 may train a machine learning model using a training set including past sensed signals and the corresponding selected processing modes and/or environment determinations. External device 110 and/or network 112 may then apply the machine learning model to select a processing mode based on a comparison between current input audio signals and the prior input audio signals.

External device 110 may transmit the selected processing modes to hearing instruments 102 and hearing instruments 102 may present the selected processing modes to the user, e.g., by outputting sounds generated by each of the selected processing modes to the user. For example, external device 110 and/or network 112 selects a first processing mode and a second processing mode from a plurality of processing mode and transmit instructions and/or parameters corresponding to the first and second processing modes to hearing instruments 102. Hearing instruments 102 then apply the first and second processing modes to input audio signals to generate a first output audio signal and a second output audio signal, respectively. Hearing instruments 102 then output sound based on the first and second output audio signals to the user. Upon receiving a user selection selecting one of the first or second output audio signals as a preferred output audio signal, hearing instruments 102 may output sound to the user using the processing mode corresponding to the preferred output audio signal. For example, hearing instruments 102 may apply the first processing mode to input audio signals based on a user selection of the first output audio signal as the preferred output audio signal. Hearing instruments 102 may transmit information corresponding to the user selection to external device 110 and/or network 112.

Hearing instruments 102 may receive the user selection via user input receive by a user interface on one or more of hearing instruments 102, sensor(s) on hearing instruments 102, or the like. Hearing instruments 102 and/or external device 110 may transmit a notification to user prior to any changes to the processing modes used by hearing instruments 102, e.g., to reduce user discomfort and provide the user with improved control over hearing instruments 102.

Figure 2:
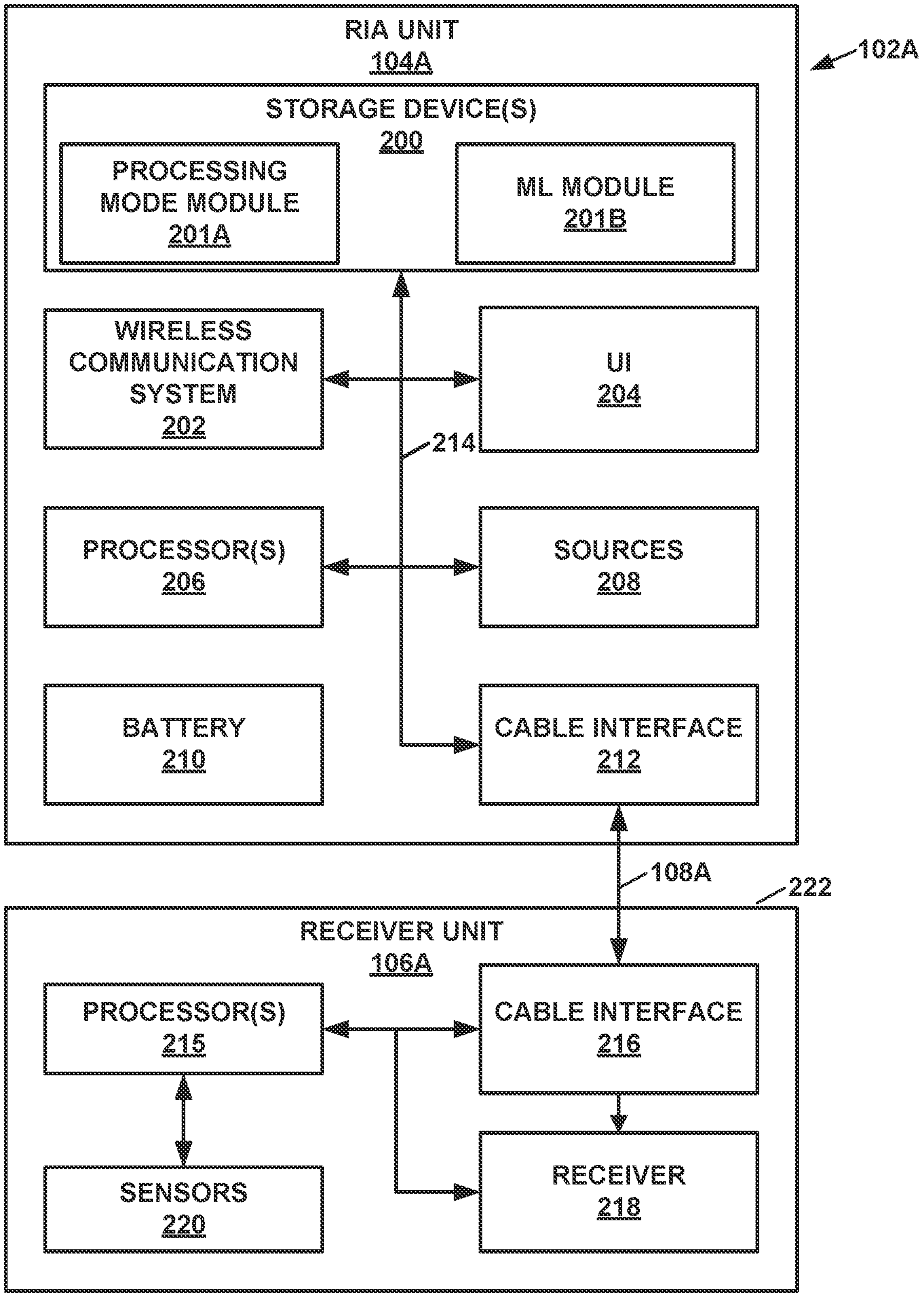
FIG. 2 is a block diagram illustrating example components of an example hearing instrument of FIG. 1.

FIG. 2 is a block diagram illustrating example components of an example hearing instrument of FIG. 1. As illustrated in FIG. 2, hearing instrument 102A includes RIC unit 104A and receiver unit 106A configured according to one or more techniques of this disclosure. Hearing instrument 102B may include similar components to those shown in FIG. 2. In another example, other hearing instruments 102 include the components described herein in a single device (e.g., in a single IIC or CIC device).

In the example of FIG. 2, RIC unit 104A includes one or more storage device(s) 200, a wireless communication system 202, user interface (UI) 204, one or more processor(s) 206, one or more sources 208, a battery 210, a cable interface 212, and communication channels 214. Communication channels 214 provide communication between storage device(s) 200, wireless communication system 202, processor(s) 206, sources 208, and cable interface 212. Storage devices 200, wireless communication system 202, processors 206, sources 208, cable interface 212, and communication channels 214 may draw electrical power from battery 210, e.g., via appropriate power transmission circuitry. In other examples, RIC unit 104A may include more, fewer, or different components. For instance, RIC unit 104A may include a wired communication system instead of a wireless communication system and RIC unit 104A and RIC unit 104B may be connected via the wired communication system.

Furthermore, in the example of FIG. 2, receiver unit 106A includes one or more processor(s) 215, a cable interface 216, a receiver 218, and one or more sensors 220. In other examples, receiver unit 106A may include more, fewer, or different components. For instance, in some examples, receiver unit 106A does not include sensors 220 or receiver unit 106A may include an acoustic valve that provides occlusion when desired. In some examples, receiver unit 106A has a housing 222 that may contain some or all components of receiver unit 106A (e.g., processors 215, cable interface 216, receiver 218, and sensors 220). Housing 222 may be a standard shape or may be customized to fit a specific user's ear.

Storage device(s) 200 of RIC unit 104A include devices configured to store data. Such data may include computer-executable instructions, such as software instructions or firmware instructions. Storage device(s) 200 may include volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 200 may further be configured for long-term storage of information as non-volatile memory space and retain information after power on/off cycles. Examples of non-volatile memory configurations may include flash memories, or forms of electrically programmable memories (EPROM) or electrically erasable and programmable (EEPROM) memories.

In some examples, hearing instrument 102A may store data corresponding to one or more processing modes (e.g., parameters of the one or more processing modes), input audio signals, and/or output audio signals, in storage device(s) 200. Hearing instrument 102A may then transmit the stored information from storage device(s) 200 to external device 110, network 112, and/or one or more other computing devices, computing systems, and/or cloud computing environments.

Storage device(s) 200 may define one or more modules (e.g., processing mode(s) module 201A, machine learning (ML) module 201B), collectively referred to as "modules 201," each of modules 201 being configured to store different types of information. For example, hearing instrument 102A may store data corresponding to one or more processing modes, such as parameters of the one or more processing modes, in processing mode(s) module 201A and retrieve the data corresponding to one or more processing modes from processing mode(s) module 201A. Hearing instrument 102A may store one or more ML models, as described in greater detail below, in ML module 201B of storage device(s) 200.

Wireless communication system 202 may enable RIC unit 104A to send data to and receive data from one or more other computing devices, e.g., external device 110, hearing instrument 102B. Wireless communication system 202 may use various types of wireless technology to communicate. For instance, wireless communication system 202 may use Bluetooth, Bluetooth LE, 3G, 4G, 4G LTE, 5G, ZigBee, WiFi, Near-Field Magnetic Induction (NFMI), or another communication technology. In other examples, RIC unit 104A includes a wired communication system that enables RIC unit 104A to communicate with one or more other devices, such as hearing instrument 102B, via a communication cable, such as a Universal Serial Bus (USB) cable or a Lightning™ cable.

Sources 208 include one or more components configured to convert an input (e.g., sound, electromagnetic energy) into electrical signals. In other words, sources 208 may generate one or more input audio signals. Sources 208 may include, but are not limited to, microphones and telecoils. While sources 208 are described primarily with reference to microphones and telecoils herein, it may be appreciated that the techniques may be applied to input audio signals from one or more other sources 208. In some examples, sources 208 are included in receiver unit 106A instead of RIC unit 104A. In some examples, one or more of sources 208 are included in RIC unit 104A and one or more of sources 208 are included in receiver unit 106A.

Sources 208 may include microphones configured to convert sound into electrical signals. In some examples, sources 208 include a front microphone and a rear microphone. The front microphone may be located closer to the front (i.e., ventral side) of the user. The rear microphone may be located closer to the rear (i.e., dorsal side) of the user. One or more of sources 208 are omnidirectional microphones, directional microphones, or another type of microphones. Sources 208 may include one or more telecoils. The telecoils may detect wireless signals modulated to carry audio signals. For example, the telecoils may detect electromagnetic energy and detect an audio signal carried by the energy. In some examples, one or more of sources 208 may be one or more external microphones or telecoils operatively connected to hearing instruments 102 using an electromagnetic audio or data transmission scheme, e.g., Bluetooth, Bluetooth LE, 900 MHz, 2.4 GHz, FM, infrared, 3G, 4G, 4G LTE, 5G, ZigBee, WiFi, Near-Field Magnetic Induction (NFMI) and the like.

Processors 206 (also referred to as "processing system 206") include circuitry configured to process information. RIC unit 104A may include various types of processors 206.

For example, RIC unit 104A may include one or more microprocessors, digital signal processors, microcontroller units, and other types of circuitries for processing information. In some examples, one or more of processors 206 may retrieve and execute instructions stored in one or more of storage devices 200. The instructions may include software instructions, firmware instructions, or another type of computer-executed instructions. In accordance with the techniques of this disclosure, processors 206 may perform processes for determining contextual information, determining a current acoustic environment of hearing instrument 102A and/or the user, and/or selecting a first and second processing mode based on the contextual information and/or the current acoustic environment. In different examples of this disclosure, processors 206 may perform such processes fully or partly by executing such instructions, or fully or partly in hardware, or a combination of hardware and execution of instructions.

Processors 206 may retrieve and execute instructions from storage device(s) 200 (e.g., from ML module 201B) corresponding to a machine learning model to apply the machine learning model. In some examples, processors 206 may apply a first ML model to determine a current acoustic environment of hearing instrument 102A based on the input audio signals. In some examples, processors 206 may apply a second ML model to select a first and second processing mode based on a determined current acoustic environment. In some examples, processors 206 may apply a third ML model to select the first and second processing modes based on the input audio signals. In some examples, processor 206 may apply other ML models to perform any of the processes and/or functionalities of processing and/or computing circuitry as described herein.

The first ML model may be trained, e.g., by external device 110 and/or one or more computing devices, systems, and/or cloud computing environments connected to network 112, using a training set including past input audio signals and the corresponding determined acoustic environment. Determined acoustic environments may be assigned a label including, but are not limited to, "inside a vehicle," "indoors," "outdoors," "quiet," "speech-in-quiet," "machine noise," "speech-in-machine-noise," "crowd noise," "speech-in-crowd-noise," "auditorium," "restaurant," "music," "speech-in-music," "television," "meeting," "hearing loop," "telephone," etc. In some examples, the training set may also include contextual information in addition to or instead of the label. The contextual information may include, but are not limited to, "speech nearby," "loud audio source nearby," or the like. A "loud audio source" may be an audio source with a sound output exceeding or is equal to a threshold sound level (e.g., a threshold decibel level). The threshold decibel level can vary. In some embodiments, the threshold decibel level is about 55 decibels, 60 decibels, 65 decibels, 75 decibels, 80 decibels, 85 decibels, 90 decibels, 95 decibels, 100 decibels, 105 decibels, 110 decibels, 115 decibels or louder, or a sound pressure level falling within a range between any of the foregoing. The training set may include data from the user and/or one or more other individuals who are similar to the user (e.g., also using hearing instruments 102 or similar hearing instruments, have similar hearing impairment and/or other conditions). When applied by processors 206, the first ML model may determine, based on the sensed signals (e.g., input audio signal from sources 208 signals from other sensor(s)), a label for an acoustic environment surrounding hearing instrument 102A and/or contextual information of the acoustic environment.

The second ML model may be trained, e.g., by external device 110 and/or one or more computing devices, systems, and/or cloud computing environments connected to network 112, using a training set including past acoustic environments (e.g., past acoustic environment labels) and/or contextual information and the corresponding selected processing mode(s). Within the training set, each processing mode may be identified by parameters of the processing mode and/or a label assigned to the processing mode, the label corresponding to a predetermined set of parameters corresponding to the processing mode stored in storage device(s) 200. The training set may include data from the user and/or one or more other individuals who are similar to the user (e.g., also using hearing instruments 102 or similar hearing instruments, have similar hearing impairment and/or other conditions). When applied by processors 206, the second ML model may select two or more processing modes (e.g., a first and second processing mode) based on a determined acoustic environment and/or contextual information (e.g., via application of the first ML model by processors 206). The second ML model may output the parameters for each processing mode. In some examples, the second ML model may output a label for each processing mode and processors 206 may retrieve the data corresponding to the selected processing modes from storage device(s) 200 via the outputted labels.

The third ML model may be trained, e.g., by external device 110 and/or one or more computing devices, systems, and/or cloud computing environments connected to network 112, using a training set including past input audio signals and the corresponding selected processing mode(s). The training set may include data from the user and/or one or more other individuals who are similar to the user (e.g., also using hearing instruments 102 or similar hearing instruments, have similar hearing impairment and/or other conditions). When applied by processors 206, the third ML model may select two or more processing modes (e.g., a first and second processing mode) based on input audio signals from source 208. The third ML may output the selected processing modes in a same or similar manner as the second ML model.

The ML models may be implemented in one of a variety of ways. For example, the ML models may be implemented as an artificial neural network (ANN). The ANN may be a fully connected model that includes one or more hidden layers. The ANN may use a sigmoid activation function, rectified linear unit (ReLU) activation function, or another activation function. In other examples, the ML models may include a support vector machine (SVM), or other type of ML model.

UI 204 may be configured to transmit notifications to the user and/or receive user input and/or user selection. UI 204 may include, but are not limited to, lights, buttons, dials, switches, microphones, a haptic feedback component, or the like. UI 204 may be configured to receive tactile, gestural (e.g., movement of a head, or a limb of the user), visual and/or auditory feedback from the user indicating user input. UI 204 may then convert the received feedback into electrical signals and transmit the electrical signals to other components within hearing instrument 102A via communications channels 214. UI 204 may also receive instructions to transmit a notification to the user via communications channels 214 and output a visual, auditory, and/or tactile feedback to the patient. UI 204 may be in communication with receiver unit 106A and may receive feedback from and/or transmit notifications to the user via one or more components of receiver unit 106A, e.g., receiver 218.

In the example of FIG. 2, cable interface 212 is configured to connect RIC unit 104A to communication cable 108A. Communication cable 108A enables communication between RIC unit 104A and receiver unit 106B. Cable interface 212 may include a set of pins configured to connect to wires of communication cable 108A. In some examples, cable interface 212 includes circuitry configured to convert signals received from communication channels 214 to signals suitable for transmission on communication cable 108A. Cable interface 212 may also include circuitry configured to convert signals received from communication cable 108A into signals suitable for use by components in RIC unit 104A, such as processors 206. In some examples, cable interface 212 is integrated into one or more of processor(s) 206. Communication cable 108 may also enable RIC unit 104A to deliver electrical energy to receiver unit 106.

In some examples, communication cable 108A includes a plurality of wires. The wires may include a Vdd wire and a ground wire configured to provide electrical energy to receiver unit 106A. The wires may also include a serial data wire that carries data signals and a clock wire that carries a clock signal. For instance, the wires may implement an Inter-Integrated Circuit ($I^2C$ bus). Furthermore, in some examples, the wires of communication cable 108A may include receiver signal wires configured to carry electrical signals (e.g., output audio signals) that may be converted by receiver 218 into sound.

In the example of FIG. 2, cable interface 216 of receiver unit 106A is configured to connect receiver unit 106A to communication cable 108A. For instance, cable interface 216 may include a set of pins configured to connect to wires of communication cable 108A. In some examples, cable interface 216 includes circuitry that converts signals received from communication cable 108A to signals suitable for use by processors 215, receiver 218, and/or other components of receiver unit 106A. In some examples, cable interface 216 includes circuitry that converts signals generated within receiver unit 106A (e.g., by processors 215, sensors 220, or other components of receiver unit 106A) into signals suitable for transmission on communication cable 108A.

Receiver unit 106A may include various types of sensors 220. For instance, sensors 220 may include accelerometers, gyroscopes, IMUs, heartrate monitors, temperature sensors, and so on. In some examples, at least some of the sensors may be disposed within RIC unit 104A. Like processor(s) 206, processor(s) 215 include circuitry configured to process information. For example, processor(s) 215 may include one or more microprocessors, digital signal processors, microcontroller units, and other types of circuitry for processing information. In some examples, processor(s) 215 may process signals from sensors 220. In some examples, processor (s) 215 process the signals from sensors 220 for transmission to RIC unit 104A. Signals from sensors 220 may be used for various purposes, such as evaluating a health status of a user of hearing instrument 102A, determining an activity of a user (e.g., whether the user is in a moving car, running), receiving user feedback and/or user selection, and so on.

In some examples, sensors 220 may be used to receive user selection and/or user feedback. sensors 220 (e.g., accelerometers, gyroscopes, IMUs) in receiver unit 106A may detect movement of the user's head within a particular window of time and processor(s) 206 and/or processor(s) 215 may determine a user selection based on the movement. For example, processor(s) 206 and/or processor(s) 215 may determine that the user selected a processing mode applied by hearing instrument 102A based on a determination by sensors 220 that the user tilted their head in the direction of hearing instrument 102A within a particular window of time. The particular window of time may be a predetermined period (e.g., a number of seconds, minutes) following output of a sound by hearing instrument 102A based on the processing mode. If sensors 220 do not detect user head movement and/or detect user head movement not indicative of a selection (e.g., due to an insufficient magnitude of rotation), sensors 220 may return to normal sensing activities upon termination of the particular window of time.

In some examples, the user may make a selection by movement of a hand to an ear of the user. For example, the user may move their hand towards their right ear to select an output sound signal in their right ear. In such examples, processor(s) 206 and/or processor(s) 215 may determine the hand movements based on changes in an acoustic feedback path detected by sensors 220 (e.g., microphone(s)).

Processor(s) 206 and/or processor(s) 215 may generate a local output audio signal based on the one or more input audio signals generated by sources 208 and based on an applied processing mode. Based on the applied processing mode (e.g., based on the parameters of the applied processing mode), processor(s) 206 and/or processor(s) 215 may mix input audio signals from different sources 208 at different ratios, apply one or more filters to one or more of the input audio signals, adjusting the gain of one or more of the input audio signals, reducing/cancelling background noise, applying any suitable speech enhancement technique(s) or method(s), and/or otherwise modifying the input audio signal into the output audio signal. For a same plurality of input audio signals, processor(s) 206 and/or processor(s) 215 may apply different processing modes to generate different output audio signals. Some of the processing modes may be specialized for specific functions, e.g., speech comprehension, noise reduction. Some of the processing modes may be intended for specific environments (e.g., in a vehicle, indoors, outdoors) and/or for particular contextual situations (e.g., for a sporting event, for a concert).

Receiver 218 includes one or more loudspeakers for producing sound based on the output audio signal. In some examples, the speakers of receiver 218 include one or more woofers, tweeters, woofer-tweeters, or other specialized speakers for providing richer sound.

In other examples, hearing instruments 102 (FIG. 1) may be implemented as a BTE device in which components shown in receiver unit 106A are included in a housing having similar functions to RIC unit 104A secured behind the ear of the user and a sound tube extends from receiver 218 into the user's ear. The sound tube may comprise an air-filled tube that channels sound into the user's ear. In such examples, cable interface 212, cable interface 216, and processors 215 may be omitted. Furthermore, in such examples, receiver 218 may be integrated into the housing. In some examples, sensors 220 may be integrated into the RIC unit.

Figure 3:
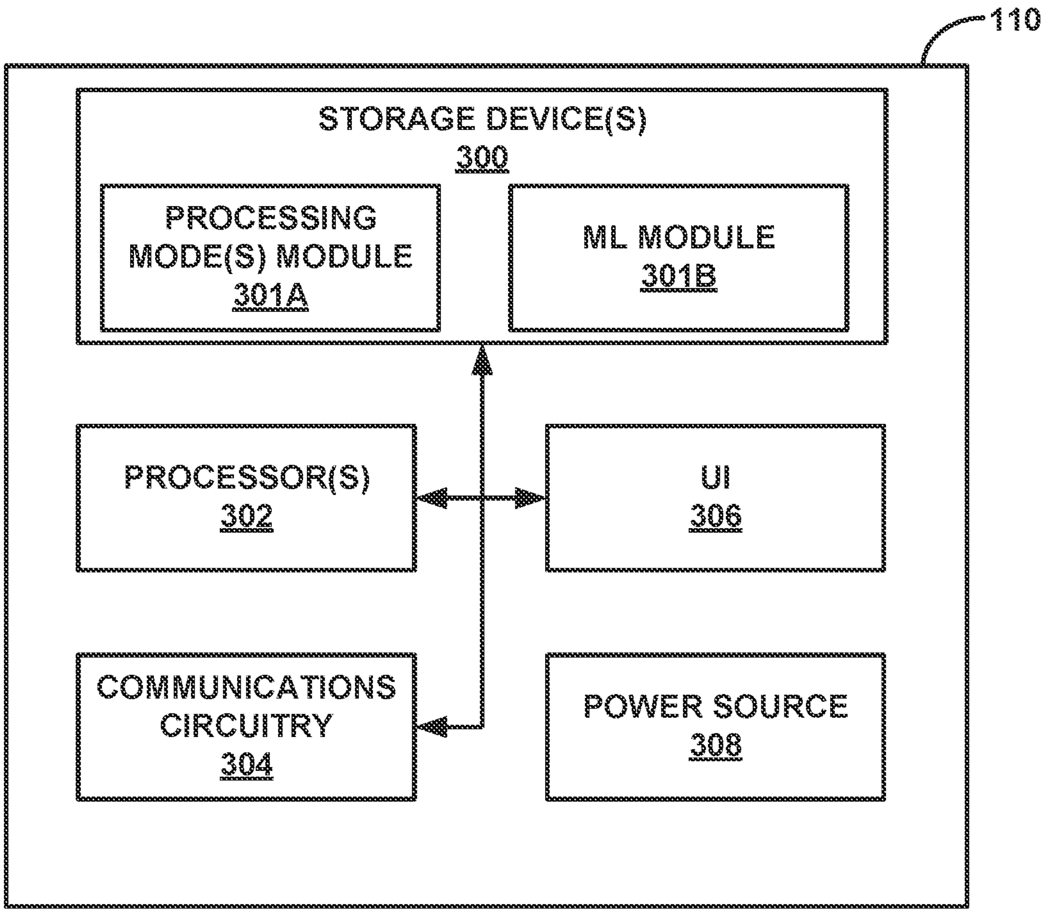
FIG. 3 is a block diagram illustrating an example external device of FIG. 1.

FIG. 3 is a block diagram illustrating an example external device 110 of FIG. 1. As illustrated in FIG. 3, external device 110 may include storage device(s) 300, processor(s) 302, communications circuitry 304, user interface (UI) 306, and power source 308. In other examples, external device 110 may include more or fewer components than the example external device 110 illustrated in FIG. 3. In some examples, hearing instruments 102 may communicate directly with network 112 and the components and functions illustrated in FIG. 3 may be implemented by network 112 and/or one or more other computing devices, computing systems, and/or cloud computing environments connected to network 112.

Storage device(s) 300 of external device 110 include devices configured to store data. Such data may include computer-executable instructions, such as software instructions or firmware instructions. Storage device(s) 300 may include volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 300 may further be configured for long-term storage of information as non-volatile memory space and retain information after power on/off cycles. Examples of non-volatile memory configurations may include flash memories, or forms of electrically programmable memories (EPROM) or electrically erasable and programmable (EEPROM) memories.

Storage device(s) 300 may store data corresponding a plurality of processing modes for hearing instruments 102. Data corresponding to each of the plurality of processing modes may be transmitted to hearing instruments 102, e.g., via communications circuitry 304, to cause hearing instruments 102 to output sound to the user based on the transmitted processing mode. For example, external device 110 may transmit, via communications circuitry 304, parameters corresponding to a processing mode to hearing instruments 102. Hearing instruments 102 may then process input audio signals based on the parameters corresponding to the processing mode to generate an output audio signal based on the processing mode. Data corresponding to each processing mode includes parameters of the processing mode and/or instructions to change audio processing settings in hearing instruments 102 to settings corresponding to the processing mode. In some examples, based on user feedback, external device 110 and/or network 112 may adjust one or more of the processing modes (e.g., one or more parameters of the processing mode) and store the adjusted processing modes in storage device(s) 300.

Storage device(s) 300 may store instructions that, when executed by processor(s) 302, cause external device 110 to determine a current acoustic environment of the user and/or contextual information about the environment and to select processing modes from the plurality of processing modes based on the determination.

Storage device(s) 300 may define one or more modules configured to store different information and/or instructions. The modules may include, but are not limited to, a processing mode(s) module 301A and a machine learning (ML) module 301B (collectively referred to as "modules 301"). Processing mode(s) 301A may store the data corresponding to each of the plurality of processing modes. ML module 301B may store one or more ML models configured to be applied by processor(s) 302 to determine a current acoustic environment of hearing instruments 102, contextual information of the current acoustic environment, to select one or more processing modes based on the determined acoustic environment and/or the contextual information, or the like.

Processor(s) 302 may execute instructions to determine an environment the user is in. For example, processor(s) 302 may receive the input audio signals from hearing instruments 102 and determine the current acoustic environment and/or additional contextual information based on the presence of identifiable induction hearing loops, linguistic speech sounds, and/or other identifiable sounds in the input audio signal. In some examples, processor(s) 302 may determine the current acoustic environment based on sensed signals from the other sensor(s) (e.g., microphones, telecoils, electromagnetic radios, GPS sensors, IMUs, EEG sensors, barometers, magnetometers, virtual beacons, physical beacons) in communication with processor(s) 302. Processor(s) 302 may then select two or more processing modes from the plurality of processing modes stored in storage device(s) 300 that correspond to user preference, e.g., for the current acoustic environment and transmit the selected processing modes to the user.

Processor(s) 302 may, based on the determined current acoustic environment and/or contextual information, select processing modes previously marked (e.g., by the user, by a clinician) as a default processing mode for a particular acoustic context (e.g., particular acoustic environment and/or contextual information). In some examples, the default processing mode may be a same processing mode (e.g., a factory-standard processing mode) for all situations, irrespective of the acoustic context. In some examples, processor(s) 302 may select two default processing modes for different acoustic contexts for presentation to the user. Processor(s) 302 may determine a second acoustic environment that is similar to the determined acoustic environment and select a default processing mode corresponding to the second acoustic environment. In some examples, processor (s) 302 may retrieve, for the determined acoustic environment, default processing modes for other users who are similar to the user (e.g., who have similar auditory capability, functionality, and/or impairment) and select default processing modes from the retrieved default processing modes.

In some examples, processor(s) 302 may select a default processing mode as a first processing mode and modify parameters of the default processing mode to generate a second processing mode for presentation to the user. For example, processor(s) 302 may generate the second processing mode by adjusting the mix between two or more input audio signals in the default processing mode. The amount of change made to the default processing mode by processor(s) 302 may be predetermined, e.g., by the user, by a clinician. Processor(s) 302 may select a third processing mode corresponding to a different acoustic environment (e.g., an acoustic environment similar to the determined acoustic environment) and generate the second processing mode as a mix of the parameters of the first processing mode and the third processing mode.

Based on user selection, processor(s) 302 may receive information indicating a preferred processing mode from the processing modes presented to the user and/or any changes the user made to any of the presented processing modes. Based on the received information, processor(s) 302 may adjust parameters of one or more of the processing modes and set the adjusted processing modes as default processing modes the determined acoustic environment. When processor(s) 302 determines another occurrence of the determined acoustic environment, processor(s) 302 may transmit the adjusted processing modes as the default processing modes to hearing instruments 102.

Processor(s) 302 may apply one or more ML models to determine a current acoustic environment of hearing instruments 102, contextual information of the current acoustic environment, or to select one or more processing modes based on the determined acoustic environment and/or the contextual information. Processor(s) 302 may apply each ML model by retrieving and executing instructions corresponding to the ML model from ML module 301B of storage device(s) 300.

Processor(s) 302 may apply a first ML model to determine, based on the input data, a label for an acoustic environment surrounding hearing instruments 102 and/or contextual information of the acoustic environment. The input data may include input audio signals from hearing instruments 102 and/or other data from one or more sources in external device 110 and/or connected to network 112 (e.g., acoustic sensors, non-acoustic sensors, magnetic sensors, wireless radios, physiologic sensors, geographical sensors, clocks weather databases). Determined acoustic environments may be assigned a label including, but are not limited to, "inside a vehicle," "indoors," or "outdoors." In some examples, the training set may also include contextual information in addition to or instead of the label. The contextual information may include, but are not limited to, "speech nearby," "loud audio source nearby," or the like. The training set may include data from the user and/or one or more other individuals who are similar to the user (e.g., also using hearing instruments 102 or similar hearing instruments, have similar hearing impairment and/or other conditions).

Processor(s) 302 may apply a second ML model to select two or more processing modes (e.g., a first and second processing mode) based on a determined acoustic environment and/or contextual information (e.g., via application of the first ML model by processor(s) 302). The second ML model may be trained using a training set including past acoustic environments (e.g., past acoustic environment labels) and/or contextual information and the corresponding selected processing mode(s). Within the training set, each processing mode may be identified by parameters of the processing mode and/or a label assigned to the processing mode, the label corresponding to a predetermined set of parameters corresponding to the processing mode stored in storage device(s) 300. The training set may include data from the user and/or one or more other individuals who are similar to the user (e.g., also using hearing instruments 102 or similar hearing instruments, have similar hearing impairment and/or other conditions). The second ML model may output the parameters for each processing mode. In some examples, the second ML model outputs a label for each processing mode and processors 302 may retrieve the data corresponding to the selected processing modes from storage device(s) 300 via the outputted labels.

Processor(s) 302 may apply a third ML model to select two or more processing modes (e.g., a first and second processing mode) based on input data. The input data may include, but are not limited to, input audio signals from hearing instruments 102 and/or other data from one or more sources in external device 110 and/or connected to network 112 (e.g., acoustic sensors, non-acoustic sensors, magnetic sensors, wireless radios, physiologic sensors, geographical sensors, clocks weather databases).

The machine learning model may be implemented in one of a variety of ways. For example, the machine learning model may be implemented as an artificial neural network (ANN). The ANN may be a fully connected model that includes one or more hidden layers. The ANN may use a sigmoid activation function, rectified linear unit (ReLU) activation function, or another activation function. In other examples, the machine learning model may include a support vector machine (SVM), or other type of machine learning model.

UI 306 may include one or more components configured to receive instructions from and/or present information to the user. UI 306 may include, but are not limited to, display screens, camera, microphones, haptic feedback components, speakers, or the like. In some examples, UI 306 may receive input audio signals from a current acoustic environment of the user and UI 306 may transmit the input audio signals to processor(s) 302, e.g., for determination of the type of the current acoustic environment. In some examples, UI 306 may receive instructions from the user to change the processing mode of hearing instruments 102 and may transmit the instructions to processor(s) 302, e.g., to begin the processing mode selection process as described previously herein. UI 306 may output a notification (e.g., a visual, auditory, and/or tactile signal) to the patient indicating that hearing instruments 102 will change processing mode prior to any changes, e.g., to prevent user surprise and/or user discomfort. In some examples, hearing instruments 102 do not make any changes to the processing mode until hearing instruments 102 and/or external device 110 receive an approval from the user to proceed, e.g., via UI 204, UI 306, or the like.

Figure 4:
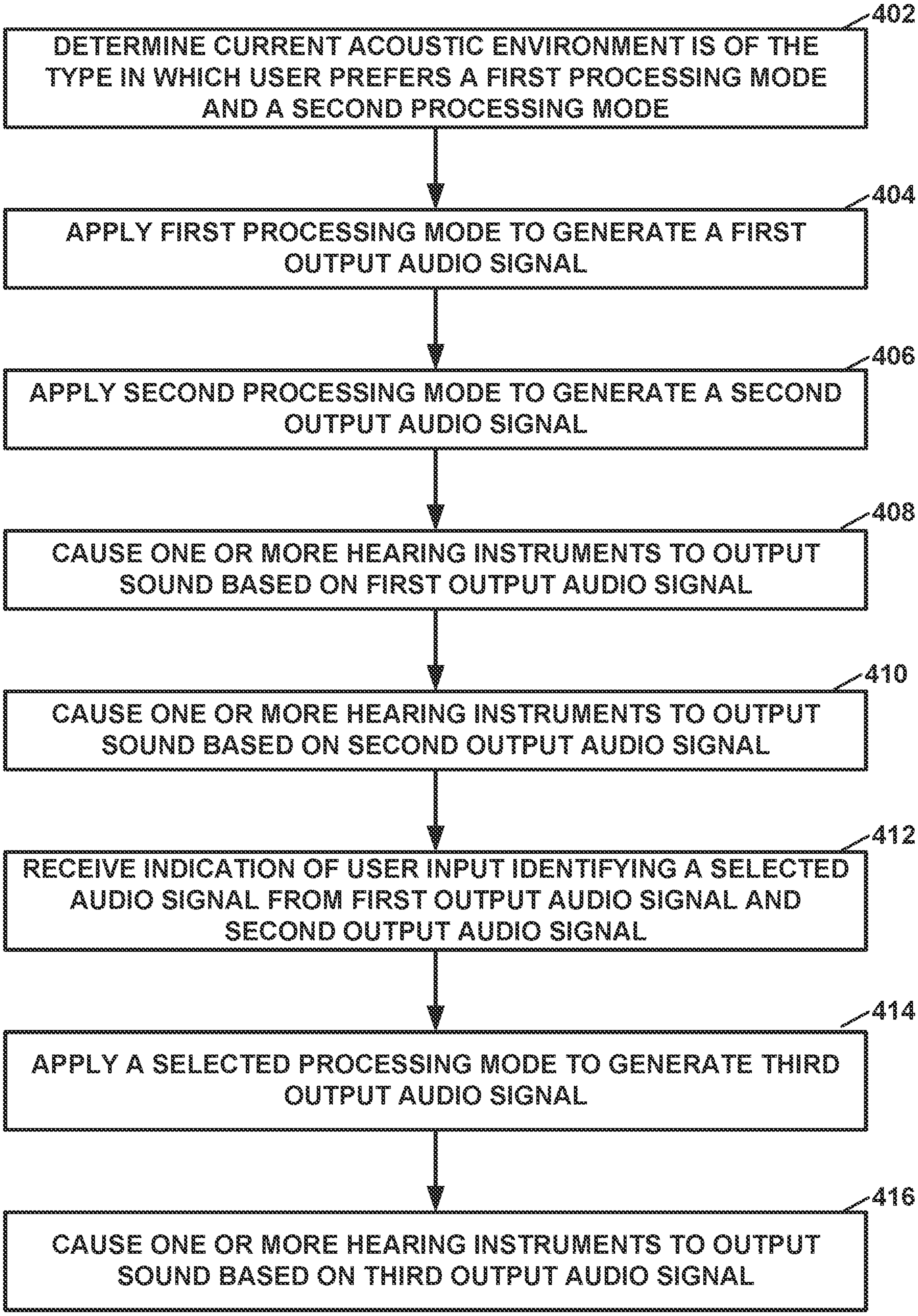
FIG. 4 is a flow diagram illustrating an example process of determining a preferred processing mode for hearing instrument(s) based on user selection.

FIG. 4 is a flow diagram illustrating an example process of determining a preferred processing mode for hearing instrument(s) 102 based on user selection. While the example process illustrated in FIG. 4 is primarily described with reference to an example processing system of the example hearing instrument system 100 of FIG. 1, the example process described herein may be applied by any other example hearing instruments, hearing instrument systems, processor(s), computing devices, computing systems, cloud computing environments, and/or networks as described herein. The processing system may include any of processing circuitry, computing circuitry, processors, and/or cloud computing environments in hearing instrument system 100 including, but are not limited to, processor(s) 206, processor(s) 215, processor(s) 302, and network 112.

The processing system may determine that a current acoustic environment is of the type in which user prefers a first processing mode and a second processing mode (402). The current acoustic environment is an acoustic environment surrounding the user and hearing instruments 102 at any given time. Each of hearing instruments 102 may receive sound from the current acoustic environment as a input audio signal, apply a processing mode (e.g., the first processing mode, the second processing mode) to generate an output audio signal, and output a sound to the user based on the output audio signal. Each of hearing instruments 102 may be worn in, on, or about an ear of a user and may include, but are not limited to, hearing aids, earbuds, headphones, earphones, personal sound amplifiers, cochlear implants, brainstem implants, osseointegrated hearing instruments, or the like.

The processing system may determine the current acoustic environment of the user based on input audio signals from one or more sources 208 or sensors 220 in hearing instruments 102. The processing system may determine the current acoustic environment and/or contextual information based at least in part on additional information from one or more other sources 208 and/or other sources in external device 110 and/or network 112 including acoustic sensors, non-acoustic sensors, magnetic sensors, wireless radios, physiologic sensors, geographical sensors, clocks weather databases, or the like. In some examples, hearing instruments 102A and 102B may duty cycle one or more of querying, sampling or processing of sources 208 and sensors 220 to determine the current acoustic environment and/or contextual information to conserve power supply. The processing system may identify the presence of induction hearing loops in the input audio signals of e.g., a telecoil and determine the current acoustic environment based on the identified induction hearing loop.

Induction hearing loops are an assistive listening technology that provides hearing aids with a direct audio input from a sound source without the requirement of the microphone of the hearing aid being active. The telecoil feature, which has historically been included in most hearing aids, allows the hearing instrument user to access wireless audio transmission via induction hearing loop systems with relatively low power consumption. Telecoil induction hearing loop systems are also advantageous in that they offer end users convenient, reliable, inconspicuous, and hygienic means of accessing wireless audio with an advantageous Signal to Noise Ratio (SNR) beyond that of typical hearing aid use. Places where hearing loops are available are required by the Americans with Disabilities Act (and the like) to be labeled with a sign which indicates the presence of the hearing loop system. However, a user may fail to see or recognize the sign or otherwise have difficulty switching into hearing loop memory (i.e. switching the device input to hearing loop mode). Furthermore, changes in telecoil sensitivity that occur with shifts in wearer's head position are a primary complaint of induction hearing loop users.

The hearing instrument may detect the presence of an induction hearing loop using any suitable method, e.g., as described in commonly owned U.S. Provisional Patent Application Ser. No. 62/914,771 entitled "Hearing Assistance System with Automatic Hearing Loop Memory" and filed on Oct. 14, 2019. For example, inputs from a telecoil may indicate the presence of an induction hearing loop when specific patterns of audio waveforms in the input audio signals are observed. In some examples, the processing system may identify a specific pattern of audio waveforms in the input audio signals as corresponding to human speech, as corresponding to music, as corresponding to a output sound from a vehicle, as corresponding to ambient noise of a crowd, or the like. In some examples, the processing system applies a machine learning model (e.g., as described above) to the input audio signals or data obtained from other sensors to determine the current acoustic environment of the user.

The processing system may select the first processing mode and the second processing mode based on the determined current acoustic environment. Each processing mode is defined by parameters that, when executed by processing system, cause the processing system to modify the input audio signal to generate the output audio signal. Application of each processing mode may cause the processing system to generate different output audio signals for a same input audio signal. Each of the processing modes may correspond to a listening preference of the user and the user may have different listening preferences for different acoustic environments. It should be appreciated that user preference may change over time depending on the momentary listening intent and attention of the user. In a given instance, the listening preferences may include an enhanced speech intelligibility preference or a noise reduction preference. When the processing system applies a processing mode corresponding to an enhanced speech intelligibility preference, the processing system may, in various examples, amplify portions of the input audio signals corresponding to speech relative to other portions of the input audio signals to generate the output audio signal.

In some examples, a processing mode corresponding to an enhanced speech intelligibility preference, the processing system may utilize the audio input obtained from a telecoil or electromagnetic radio audio stream. In various embodiments, the mix or balance of audio inputs (e.g., hearing instrument microphone(s), telecoil(s), electromagnetic radio audio stream, etc.) may be adapted to suit a preference for speech intelligibility and/or noise reduction. However, it should also be appreciated that the user's momentary preference for optimal intelligibility or noise reduction versus near-field awareness and understanding of communication partners within close proximity to the user may affect the user's preference for mix or balance of audio inputs. Advantageously, in some examples, the user may be given an intuitive interface for comparing and selecting the desired mix of audio inputs based upon their situational intent and attention, e.g., optimally understand speech in the induction hearing loop broadcast versus hearing both the induction hearing loop broadcast and communication partners within range of the user's hearing instrument's microphone(s).

In some examples, other listening preferences may include an improved bass response preference (also referred to as "bass boosting preference") or a preference for a venting feature. Another listening preference may include a preference for improved balance between the output sound and the ambient sound (also referred to as "output-ambient sound balance preference" System 100 may activate a venting feature (e.g., an auto venting feature) to control vents of hearing instrument 102, e.g., to control acoustic separation between output sounds from hearing instruments 102 and ambient sounds external to hearing instruments 102 (e.g., ambient sounds in the current acoustic environment).

When the processing system applies a processing mode corresponding to a noise reduction preference, the processing system may reduce or remove portions of the input audio signals that cross a threshold noise level (e.g., a threshold decibel). For example, the processing system may reduce or remove first portions of the input audio signal that exceed a first threshold noise level and/or second portions of the input audio signal that is below a second threshold noise level.

The processing system may select the first and second processing modes from a plurality of processing modes based on predetermined default processing modes for particular acoustic environments and/or general default processing modes. The processing system may select processing modes for acoustic environments matching the current acoustic environment, processing modes for acoustic environments similar to the current acoustic environment, and/or modified processing modes based on processing modes for acoustic environments similar to or matching the current acoustic environment. In some examples, the processing system applies the machine learning model to the input audio signal to output two or more processing modes.

In some examples, to determine that the current acoustic environment of hearing instrument(s) 102 is an acoustic environment in which the user may prefer either of the first processing mode and the second processing mode, the processing system may sense, via sources 208 in hearing instruments 102, sounds from an environment surrounding the user. The processing system may determine, based on the sensed sounds, the current acoustic environment of the user and select, based on the determined current acoustic environment, the first processing mode and the second processing mode from a plurality of processing modes stored in a memory of the system (e.g., in processing mode(s) module 201A of storage device(s) 200, in processing mode(s) module 301A of storage device(s) 300).

The processing system may select the first processing mode and the second processing mode from the plurality of processing modes by determining, based on the determined current acoustic environment, processing modes that correspond to at least one listening preference of the user. For example, the processing system may receive, e.g., from user input, the listening preference of the user (e.g., enhancement, comfort). Each of the first processing mode and the second processing mode may be configured to satisfy at least one of the listening preferences of the user in the current acoustic environment. In some examples, the processing system selects the first processing mode to satisfy a first listening preference (e.g., speech enhancement) and the second processing mode to satisfy a second listening preference (e.g., comfort).

The processing system may apply the first processing mode to generate a first output audio signal (404). The processing system may apply the second processing mode to generate a second output audio signal (406). The processing system may receive input audio signals from sources 208 in hearing instruments 102. For example, the processing system is configured to receive a first input audio signal from a first source and a second input audio signal from a second source. The first source may include a microphone and the second source may include a telecoil or an electromagnetic radio. The microphone may generate the first input audio signal based on sounds in acoustic environment of the one or more hearing instruments (e.g., the current acoustic environment). The telecoil may generate the second input audio signal based on the flux of the magnetic field propagated by the induction hearing loop proximate to the user. The electromagnetic radio may generate the second input audio signal based on audio data streamed from an external audio streaming device, e.g., hearing aid streaming accessory (remote microphone, media streamer, etc.), smartphone, tablet, telephone, computer, personal assistant, etc. using any suitable audio streaming frequency or scheme, e.g., Auracast, Bluetooth, Bluetooth LE, 900 MHz, 2.4 GHz, and the like.

The processing system may establish a wireless connection between hearing instruments 102 and the external audio streaming device. In some examples, the processing system may establish the wireless connection using a predetermined access key or encryption key. In some examples, the processing system may obtain an access key or encryption key as a part of establishing the wireless connection, e.g., as described in commonly-owned U.S. patent application Ser. No. 15/342,877, entitled CONFIGURABLE HEARING DEVICE FOR USE WITH AN ASSISTIVE LISTENING SYSTEM and in commonly-owned U.S. patent application Ser. No. 16/784,947, entitled ASSISTIVE LISTENING DEVICES SYSTEMS, DEVICES AND METHODS FOR PROVIDING AUDIO STREAMS WITHIN SOUND FIELDS (now issued as U.S. Pat. No. 11,304,013).

The processing system may generate the first output audio signal by applying the first processing mode to generate the first output audio signal as a first mix of the first input audio signal and the second input audio signal. The first mix of the first input audio signal and the second input audio signal may be defined by a first set of parameter values of the first processing mode. Similarly, the processing system may generate the second output audio signal by applying the second processing mode to generate the second output audio signal as a second mix of the first input audio signal and the second input audio signal. The second mix of the first input audio signal and the second input audio signal may be defined by a second set of parameter values of the second processing mode. The first mix may be different from the second mix. For example, the first mix may be a 50:50 mix of the first input audio signal (e.g., from a microphone) and the second input audio signal (e.g., from a telecoil) and the second mix may be a 25:75 mix of the first input audio signal and the second input audio signal. Other possible mixes of the first input audio signal and the second input audio signal may include, but are not limited to, a 10:90 mix, a 20:80 mix, a 33:67 mix, a 40:60 mix, a 60:40 mix, a 67:33 mix, a 75:25 mix, an 80:20 mix, a 90:10 mix, or any other mix be a 0:100 mix and a 100:0 mix.

The processing system may cause one or more of hearing instruments 102 to output sound based on the first output audio signal (408). The processing system may cause one or more of hearing instruments 102 to output sound based on the second output audio signal (410). Receivers 218 of hearing instruments 102 may convert the output audio signals into sound and output the sound to the user. In some examples, the processing system causes one or more of hearing instruments 102 to output sound based on the first output audio signal and then to output sound based on the second output audio signal. In some examples the processing system causes a first hearing instrument 102A to output sound based on the first output audio signal and a second hearing instrument 102B to output sound based on the second output audio signal simultaneously. For particular types of input audio signals (e.g., from a source directly in front of the user), the processing system and/or hearing instruments 102 may apply different head-related transfer functions (HRTFs) for each ear to provide the user with a binaural sound, e.g., to improve user differentiation between the two output audio signals. For example, with different HRTFs, it may sound to the user that a source of sound is to their left and/or right instead of directly in front.

The processing system may receive indication of user input identifying a selected audio signal from the first output audio signal and the second output audio signal (412). The user input may include, but are not limited to, a tapping gesture on one or more of hearing instruments 102, a voice instruction from the user (e.g., as detected by a microphone of hearing instruments 102), a nodding gesture of a head of the user, a selection on external device 110, and/or a nodding and/or hand gesture identified via a sensor in communication with hearing instruments 102, external device 110, and/or network 112. Hearing instruments 102 include UI 204 and/or sensors 220 configured to receive the user input. The processing system may receive the indication of user input via UI 204. UI 204 may include a tactile interface, e.g., disposed on an outer surface of hearing instrument(s) 102. The tactile interface may include buttons, switches, levers, dials, capacitive switches, or the like configured to receive tactile input from the user, e.g., a tapping gesture from the user, and to transmit the user input to the processing system. In another example, UI 204 may include gyroscope(s), accelerometers, or IMUs disposed within hearing instrument (s) 102 and configured to detect user input (e.g., a predefined movement of the head of the user, such as a rotation, nod, or the like) and to transmit the user input to the processing system. Detection of user input may be limited to particular windows of time and/or in response to particular inquiries from hearing instruments 102, e.g., to prevent the unintentional selection of processing modes and/or reduce user discomfort. In some examples, hearing instruments 102 may output an indication of a type of each output audio signal prior to the outputting of the sounds based on the output audio signals. For example, hearing instruments 102 may output a notification sound corresponding to the word "left" (e.g., via a hearing instrument 102 disposed in, on, or about a left ear of the patient) prior to outputting a first sound corresponding to the first output audio signal. Hearing instruments 102 may output a notification sound corresponding to the word "right" (e.g., via a hearing instrument 102 disposed in, on, or about a right ear of the patient) prior to outputting a second sound corresponding to the second output audio signal. The user may then enter the user input based on the notification sounds. The selected audio signal may be either of the first output audio signal or the second output audio signal. In some examples, the user may select neither the first output audio signal nor the second output audio signal. In such examples, the processing system may select a starting output audio signal as the selected output audio signal, e.g., to prevent unintended changes in the outputted audio signal, thereby reducing user discomfort. The selected output audio signal may correspond to a selected processing mode which may be one of the first processing mode and the second processing mode.

The processing system may, based on receiving the indication of user input identifying the selected output audio signal, apply the selected processing mode to generate a third output audio signal (414). The third output audio signal may be the same as one of the first output audio signal or the second output audio signal. For example, if the user selected the first output audio signal, the third output audio signal may be the same as the first output audio signal. In some examples, the third output audio signal may be different from either the first output audio signal or the second output audio signal.

The processing system may cause one or more of hearing instruments 102 to output sound based on the third output audio signal (416). The processing system may store the selected processing mode and associate the selected processing mode with the current acoustic environment, e.g., as a preferred processing mode for specific acoustic environment.

At other times, e.g., at a time later than a time when the processing system received the indication of user input, the processing system may determine that hearing instruments 102 are again in the specific acoustic environment. In response to the determination, the processing system may generate a fourth output audio signal based on a mix of second subsequent portions of the first and second input audio signals, wherein the selected set of parameters for the selected processing mode defines the mix of the second subsequent portions of the first and second input audio signals. The processing system may then cause one or more of hearing instruments 102 to output sound based on the fourth output audio signal. In some examples, the processing system applies a machine learning model to determine that hearing instruments 102 are in the specific acoustic environment.

In some examples, the processing system may receive additional user input after causing hearing instruments 102 to output sound based on the third output audio signal. The processing system may, in response to the user input, cause hearing instruments 102 to output sound based on the first output audio signal (408) and/or sound based on the second output audio signal (410), thereby providing the user with control to re-select output audio signal from the first and second output audio signals. In some examples, in response to user input, the processing system may re-determine the current acoustic environment and/or re-select the first and second processing modes based on the current acoustic environment.

In some examples, in response to the user input, the processing system may cause hearing instruments 102 to output sound based on a fourth output audio signal. The fourth output audio signal may be different from any of the first, second, or third output audios signals. The fourth output audio signal may correspond to a default processing mode or another predetermined processing modes (e.g., a default processing mode for another specific acoustic environment).

Figure 5:
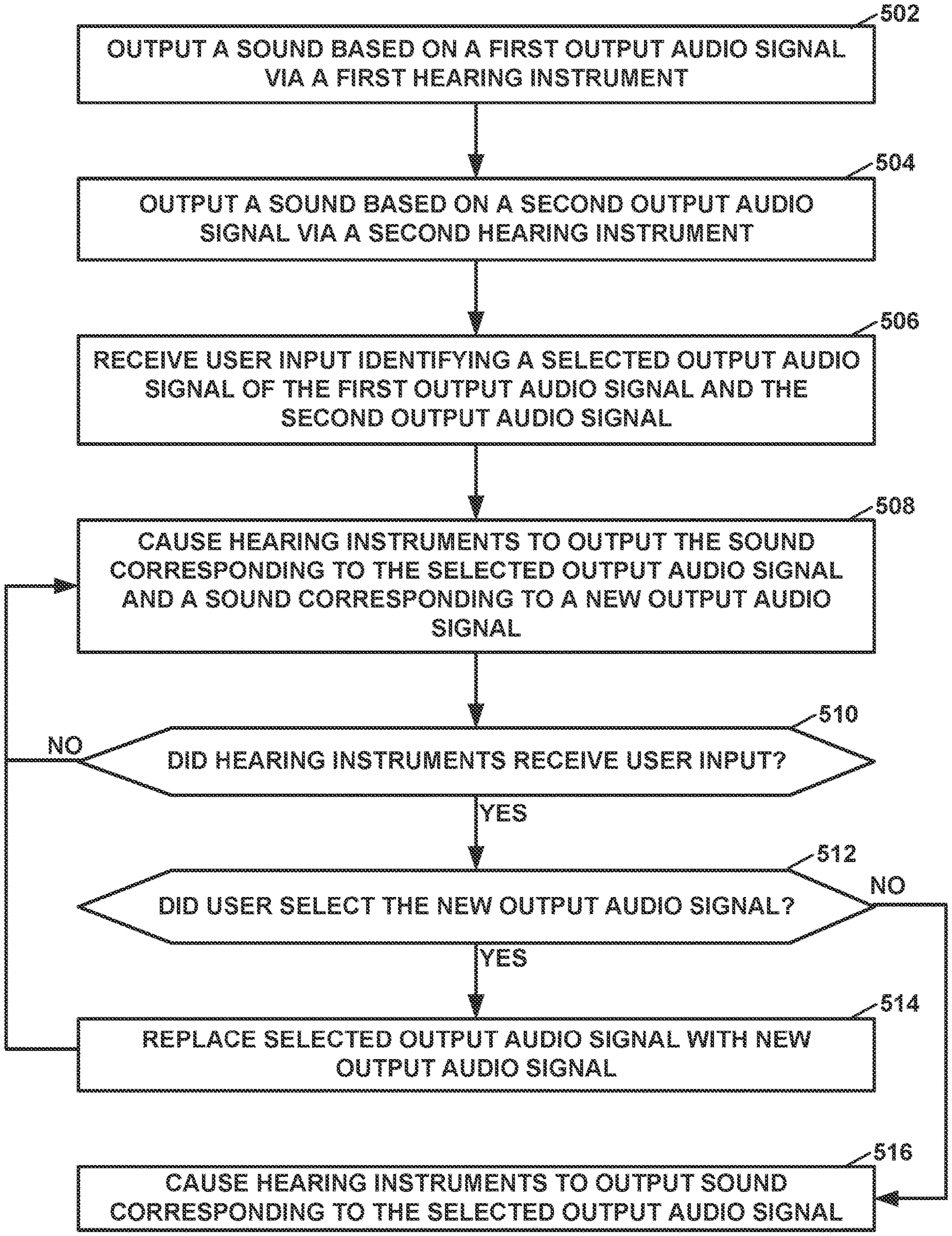
FIG. 5 is a flow diagram illustrating another example process of determining a preferred processing mode for hearing instrument(s) based on user selection.

FIG. 5 is a flow diagram illustrating another example process of determining a preferred processing mode for hearing instruments 102 based on user selection. A processing system of system 100 may determine a current acoustic environment of the user, select a first processing mode and a second processing mode, apply the first processing mode to generate a first output audio signal, and apply the second processing mode to generate a second output audio signal in accordance with example processes described with respect to FIGS. 1-4.

The processing system may output a sound based on the first output audio signal via a first hearing instrument 102A (502), output a sound based on a second output audio via a second hearing instrument 102B (504), and receive user input identifying a selected output audio signal of the first output audio signal and the second output audio signal (506).

Based on the received user input, the processing system may cause hearing instruments 102 to output a sound corresponding to the selected output audio signal and a sound corresponding to a new output audio signal (508). The new processing mode may be different from either the first processing mode or the second processing mode. The processing system may select a new processing mode (i.e., a "third processing mode") from a plurality of available processing modes based on the current acoustic environment and generate the new output audio signal based on the new processing mode. In some examples, the processing system selects or generates the new processing mode by adjust one or more parameters of the select processing mode. For example, the processing system may generate the new processing mode by adjusting the mix of the first input audio signal and the second input audio signal in the selected output audio signal by a predetermined amount (e.g., by 5%, by 10%, or the like). The processing system may select/generate and present the new processing modes to the user to further optimize a preferred processing mode for a particular acoustic environment and/or context. In some examples, one or more of hearing instruments 102 output the sounds corresponding to the selected output audio signal and the new output audio signal sequentially. In some examples, first hearing instrument 102A outputs the sound corresponding to the selected output audio signal and second hearing instrument 102B outputs the sound corresponding to the new output audio signal, or vice versa.

The processing system may determine whether hearing instruments 102 received user input (510). The user input may indicate user selection identifying an output audio signal of the selected output audio signal or the new output audio signal. Based on a determination that hearing instruments 102 did not receive user input ("NO" branch of 510), the processing system may continue to cause hearing instruments 102 to output sounds corresponding to the selected output audio signal and the new output audio signal (508).

If the processing system determines that hearing instruments 102 received user input ("YES" branch of 510), the processing system may determine whether the user selected the new output audio signal (512). User selection of the new output audio signal may indicate a preference for the new output audio signal over the selected output audio signal. If the user selected the new output audio signal ("YES" branch of 512), the processing system may replace the selected output audio signal with the new output audio signal (514) and continue to present new processing modes to the user in accordance with Steps 508-514. For example, the processing system may assign the new output audio signal (i.e., the "third output audio signal" based on the "third processing mode") as the updated selected output audio signal and select another output audio signal (i.e., the "fourth output audio signal") as a part of Step 508. If the user did not select the new output audio signal ("NO" branch of 512), the processing system may cause hearing instruments 102 to output sound corresponding to the selected output audio signal (516).

The processing system may perform the example process of steps 508-514 for a predetermined number of times before causing hearing instruments 102 to output sounds corresponding to the currently selected output audio signal. In some examples, the processing system may determine that no user input has been received for a predetermine number of cycles of the process of steps 508-514, e.g., indicating that the user has already selected an optimal output audio signal based on the current acoustic environment and/or contextual information. In such examples, the processing system may proceed to output sound to the user based on a currently selected output audio signal.

In some examples, if the final output audio signal after the example process of FIG. 5 is different from either the first or second output audio signals, the processing system may store the processing mode corresponding to the final output audio signal in storage device(s) 200, storage device(s) 300, and/or network 112. In some examples, the processing system adjusts one or more of the first or second processing modes such that the adjusted processing mode is the same as the processing mode corresponding to the final output audio signal.

The processing system may repeat the example process of FIG. 5 to iteratively adjust the processing modes. in a single processing mode selection instance for the current acoustic environment or across multiple processing mode selection instances over time for the current acoustic environment.

Figure 6:
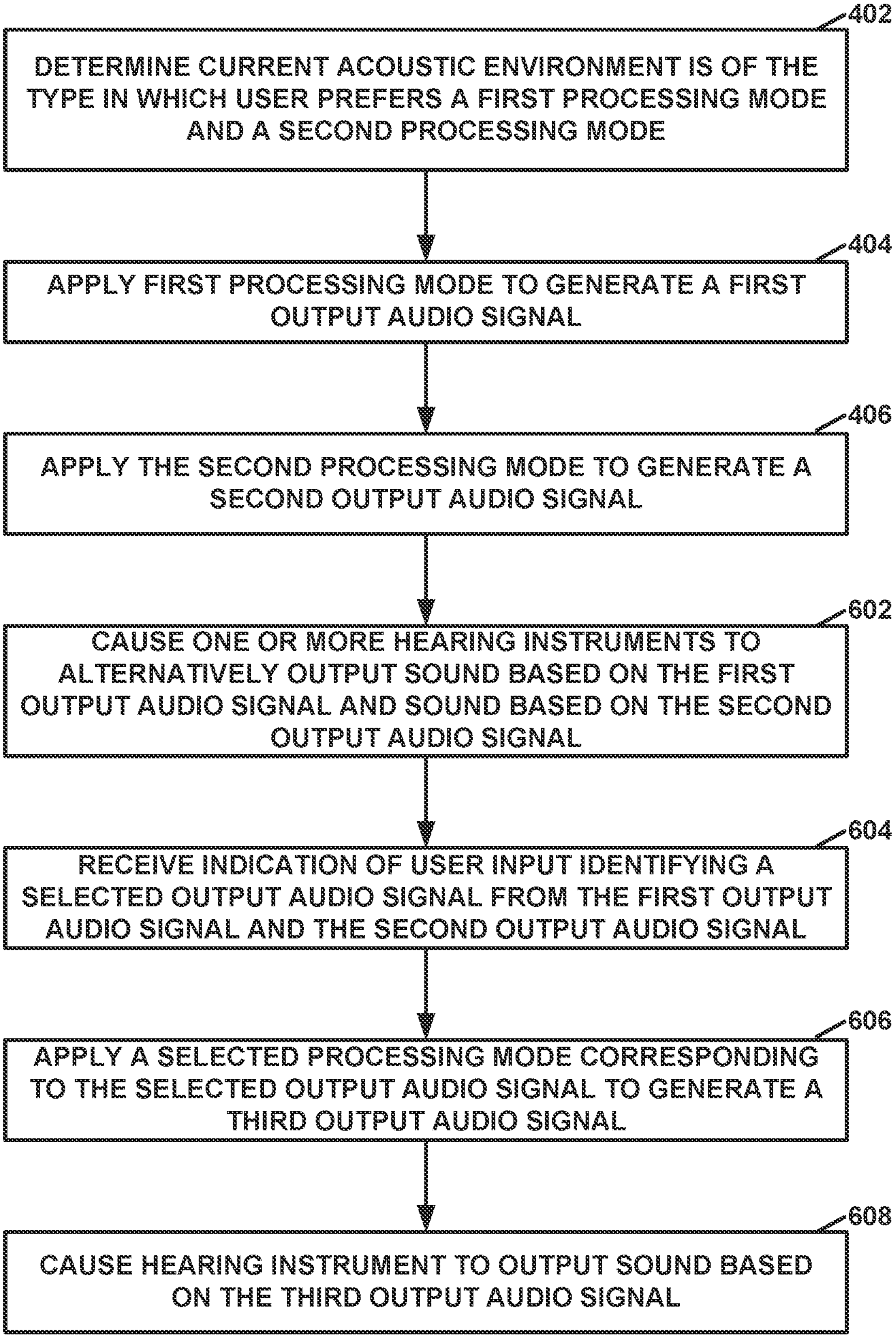
FIG. 6 is a flow diagram illustrating an example process of determining a preferred processing mode for two hearing instruments based on user selection.

FIG. 6 is a flow diagram illustrating an example process of determining a preferred processing mode for two hearing instruments 102 (e.g., first hearing instrument 102A, second hearing instrument 102B) based on user selection.

The processing system may determine that a current acoustic environment is of the type in which the user prefers a first processing mode and a second processing mode (402), apply a first processing mode to generate a first output audio signal (404), and apply a second processing mode to generate a second output audio signal (406) in accordance with the example processes previously described herein.

The processing system may cause one or more of hearing instruments 102 to alternatively output sound based on the first output audio signal and sound based on the second output audio signal (602). One or more of hearing instruments 102 may alternate between the sounds, e.g., to provide the user with an improved indication of the contrast between the first output audio signal and the second output audio signal. Hearing instruments 102 may output one of the sounds for a predetermined period of time before switching to outputting the other of the sounds for another predetermined period of time. In some examples, a first hearing instrument 102A may alternatively output the two sounds and a second hearing instrument 102B may continue to output sound from input audio signals based on a default processing mode, e.g., to maintain auditory awareness of the user while the user is selecting a more preferred processing mode.

The processing system may receive an indication of user input identifying a selected output audio signal from the first output audio signal and the second output audio signal (604). The user may select an output audio signal by interacting with hearing instruments 102 (e.g., via touching one of hearing instruments 102, via a tilting of the head of the user) during the output of the sound corresponding to the selected output audio signal by hearing instruments 102.

Based on the user's selection of the selected output audio signal, the processing system may apply a processing mode corresponding to the selected output audio signal to generate a third output audio signal (606) and cause hearing instruments 102 to output sound based on the third output audio signal (608), e.g., in a manner similar to the example processes described above. While the example process describes hearing instruments 102 alternatively outputting sounds based on two output audio signals, in some examples, hearing instruments 102 may output sounds based on three or more output audio signals. Additionally, the processing system may repeat the example process of FIG. 6, e.g., in a manner similar to the example process of FIG. 5, to iteratively optimize the output audio signals and provide the user with an optimal output audio signal for the acoustic environment and/or context. In some examples, the processing system may repeat the example process of FIG. 6 in a single processing mode selection instance for the current acoustic environment or across multiple processing mode selection instances over time for the current acoustic environment.

It is to be recognized that depending on the example, certain acts or event of any of the techniques described herein can be performed in a different sequence, may be added, merged, or left out altogether (e.g., not all described acts or events are necessary for the practice of the techniques). Moreover, in certain examples, acts or events may be performed simultaneously, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer readable storage medium which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some respects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The following is a non-limiting list of examples that are in accordance with one or more aspects of this disclosure.

Example 1: a system comprising: one or more hearing instruments configured to be worn in, on, or about an ear of a user; and a processing system configured to: determine that a current acoustic environment of the one or more hearing instruments is an acoustic environment in which the user may prefer either of a first processing mode and a second processing mode; and based on the determination: apply the first processing mode to generate a first output audio signal; apply the second processing mode to generate a second output audio signal; cause at least one of the one or more hearing instruments to output sound based on the first output audio signal; after causing the one or more hearing instruments to output the first output audio signal, cause at least one of the one or more hearing instruments to output sound based on the second output audio signal; receive an indication of user input that identifies a selected output audio signal from among the first output audio signal and the second output audio signal, wherein a selected processing mode from among the first and second processing modes was applied to generate the selected output audio signal; and based on receiving the indication of user input that identifies the selected output audio signal: apply the selected processing mode to generate a third output audio signal; and cause the one or more hearing instruments to output sound based on the third output audio signal.

Example 2: the system of example 1, wherein: the processing system is further configured to: receive a first input audio signal from a first source; and receive a second input audio signal from a second source, the processing system is configured to, as part of applying the first processing mode to generate the first output audio signal, apply the first processing mode to generate the first output audio signal as a first mix of the first input audio signal and the second input audio signal, wherein a first set of parameter values defines the first mix of the first and second input audio signals, and the processing system is configured to, as part of applying the second processing mode to generate the second output audio signal, apply the second processing mode to generate the second output audio signal as a second mix of the first input audio signal and the second input audio signal, wherein a second set of parameter values defines the second mix of the first and second input audio signals, the second mix being different from the first mix.

Example 3: the system of example 2, the first source comprises a microphone of the one or more hearing instruments and the second source comprises a telecoil of the one or more hearing instruments, the microphone is configured to generate the first input audio signal based on sounds in the current acoustic environment of the one or more hearing instruments, and the telecoil is configured to detect wireless signals modulated to carry the second input audio signal.

Example 4: the system of example 2, the first source comprises a microphone of the one or more hearing instruments and the second source comprises an electromagnetic radio of the one or more hearing instruments, the microphone is configured to generate the first input audio signal based on sounds in the current acoustic environment of the one or more hearing instruments, and the electromagnetic radio is configured to detect wireless signals modulated to carry the second input audio signal.

Example 5: the system of any of examples 1-4, wherein: the one or more hearing instruments include a first hearing instrument and a second hearing instrument, and the processing system is configured to cause the first hearing instrument to output sound based on the first output audio signal and to cause the second hearing instrument to output sound based on the second output audio signal.

Example 6: the system of any of examples 1-5, wherein the processing system is further configured to: determine that the one or more hearing instruments are in a specific acoustic environment at a time that the processing system received the indication of user input; determine, at a time later than the time that the processing system received the indication of user input, that the one or more hearing instruments are again in the specific acoustic environment; and based on determining that the one or more hearing instruments are again in the specific acoustic environment: generating a fourth output audio signal based on a mix of the first and second input audio signals, wherein a set of parameter values associated with the selected processing mode defines the mix of the first and second input audio signals; and causing the one or more hearing instruments to output sound based on the fourth output audio signal.

Example 7: the system of example 6, wherein the processing system is configured to, as part of determining that the one or more hearing instruments are again in the specific acoustic environment, apply a machine learning model to determine that the one or more hearing instruments are in the specific acoustic environment.

Example 8: the system of any of examples 1-7, wherein the processing system is configured to, as part of receiving the indication of user input, receive an indication of one or more of: a tapping gesture on the one or more hearing instruments, a voice instruction from the user, a nodding gesture of a head of the user, a gesture of the user detected by a sensor of the system, wherein the sensor is in communication with the processing system, or an input by the user into a computing device in communication with the processing system.

Example 9: the system of any of examples 1-8, wherein the processing system is configured to receive the indication of user input from a user interface of an external computing device in communication with the processing system.

Example 10; the system of any of examples 1-9, wherein to determine that the current acoustic environment of the one or more hearing instruments is an acoustic environment in which the user may prefer either of the first processing mode and the second processing mode, the processing system is configured to: sense, via one or more sources in the one or more hearing instruments, sounds from an environment surrounding the user; determine, based on the sensed sounds, the current acoustic environment of the user; and select, based on the determined current acoustic environment, the first processing mode and the second processing mode from a plurality of processing modes stored in a memory of the system.

Example 11. the system of example 10, wherein to select the first processing mode and the second processing mode from the plurality of processing modes, the processing system is configured to: determine, based on the determined current acoustic environment, a listening preference of the user; and selecting the first processing mode and the second processing mode from the plurality of processing modes based at least in part on the listening preference of the user.

Example 12: the system of example 11, wherein the listening preference comprises an enhanced speech intelligibility preference.

Example 13: the system of example 11, wherein the listening preference comprises a noise reduction preference.

Example 14: the system of any of examples 1-13, wherein each of the one or more hearing instruments comprises a user interface, and wherein the processing system is configured to receive the indication of user input via the user interface.

Example 15: the system of example 14, wherein the user interface comprises a tactile interface disposed on an outer surface of the hearing instrument, and wherein the indication of user input comprises tactile input received by the tactile interface.

Example 16: the system of any of examples 14 and 15, wherein the user interface comprises one or more sensors disposed within one of the one or more hearing instruments and configured to detect a rotation of a head of the user, and wherein the indication of user input comprises a predefined movement of the head of the user.

Example 17: the system of example 16, wherein the one or more sensors comprise one or more of an accelerometer, a gyroscope, or an inertial measurement unit (IMU).

Example 18: the system of any of examples 14-17, wherein the user interface comprises one or more sensors configured to detect user hand movement to the ear of the patient, and wherein the indication of user input comprises the user hand movement.

Example 19: the system of example 18, wherein the one or more sensors is configured to detect the user hand movement by detecting, via a microphone within the one or more hearing instruments, changes in an acoustic feedback path to the one or more hearing instruments.

Example 20: a system comprising: a first hearing instrument configured to be worn in, on, or about a first ear of a user; a second hearing instrument configured to be worn in, on, or about a second ear of the user; and a processing system configured to: determine that a current acoustic environment of the first hearing instrument and the second hearing instrument is an acoustic environment in which the user may prefer either of a first processing mode and a second processing mode; and based on the determination: apply the first processing mode to generate a first output audio signal; apply the second processing mode to generate a second output audio signal; cause the first hearing instrument to output sound based on the first output audio signal and the second hearing instrument to output sound based on the second output audio signal; receive an indication of user input that identifies a selected output audio signal from among the first output audio signal and the second output audio signal; wherein a selected processing mode from among the first and second processing modes was applied to generate the selected output audio signal; and based on receiving the indication of user input that identifies the selected output audio signal: apply the selected processing mode to generate a third output audio signal; and cause both the first hearing instrument and the second hearing instrument to output sound based on the third output audio signal.

Example 21: the system of example 20, wherein: the processing system is configured to: receive a first input audio signal from a first source; and receive a second input audio signal from a second source, wherein the processing system is configured to, as part of applying the first processing mode, to: generate the first output audio signal; and apply the first processing mode to generate the first output audio signal as a first mix of the first input audio signal and the second input audio signal, wherein a first set of parameter values defines the first mix of the first and second input audio signals, wherein the processing system is configured, as part of applying the second processing mode to generate the second output audio signal, to: generate the second output audio signal; and apply the second processing mode to generate the second output audio signal as a second mix of the first input audio signal and the second input audio signal, wherein the second set of parameter values defines the second mix of the first and second input audio signals, the second mix being different from the first mix.

Example 22: the system of example 21, wherein: the first source comprises a microphone in at least one of the first hearing instrument or the second hearing instrument, the second source comprises a telecoil of at least one of the first hearing instrument or the second hearing instrument, the microphone is configured to generate the first input audio signal based on sounds in the current acoustic environment surrounding at least one of the first hearing instrument or the second hearing instrument, and the telecoil is configured to detect wireless signals modulated to carry the second input audio signal.

Example 23: the system of example 22, wherein: the first source comprises a microphone in at least one of the first hearing instrument or the second hearing instrument, the second source comprises an electromagnetic radio of at least one of the first hearing instrument or the second hearing instrument, the microphone is configured to generate the first input audio signal based on sounds in the current acoustic environment, and the electromagnetic radio is configured to detect wireless signals modulated to carry the second input audio signal.

Example 24: the system of any of examples 20-23, wherein the processing system is configured to cause the first hearing instrument to output the sound based on the first output audio signal and to cause the second hearing instrument to output the sound based on the second output audio signal simultaneously.

Example 25: the system of any of examples 20-24, wherein the processing system is further configured to: receive a first input audio signal from a first source; receive a second input audio signal from a second source; determine that the first hearing instrument and the second hearing instrument are in a specific acoustic environment at a time that the processing system received the indication of user input; determine, at a time later than the time that the processing system received the indication of user input, that the first hearing instrument and the second hearing instrument are again in the specific acoustic environment; and based on determining that the first hearing instrument and the second hearing instrument are again in the specific acoustic environment: generating a fourth output audio signal based on a mix of the first and second input audio signals, wherein a set of parameter values associated with the selected processing mode defines the mix of the first and second input audio signals; and causing the one or more hearing instruments to output sound based on the fourth output audio signal.

Example 26: the system of example 25, wherein the processing system is configured to, as part of determining that the one or more hearing instruments are again in the specific acoustic environment, apply a machine learning model to determine that the one or more hearing instruments are in the specific acoustic environment.

Example 27: the system of any of examples 20-26, wherein the processing system is configured to, as part of receiving the indication of user input, receive an indication of one or more of: a tapping gesture on one or more of the first hearing instrument or the second hearing instrument, a voice instruction from the user, or a nodding gesture of a head of the user.

Example 28: the system of any of examples 20-27, wherein the processing system is configured to receive the indication of user input from an external computing device in communication with the processing system.

Example 29: the system of any of examples 20-28, wherein to determine that the current acoustic environment of the first hearing instrument and the second hearing instrument is an acoustic environment in which the user may prefer either of the first processing mode and the second processing mode, the processing system is configured to: sense, via one or more sources in one or more of the first hearing instrument or the second hearing instrument, sounds from an environment surrounding the user; determine, based on the sensed sounds, the current acoustic environment of the user; and select, based on the determined current acoustic environment, the first processing mode and the second processing mode from a plurality of processing modes stored in a memory of the system.

Example 30: the system of example 29, wherein to select the first processing mode and the second processing mode from the plurality of processing modes, the processing system is configured to: determine, based on the determined current acoustic environment, a listening preference of the user; and selecting the first processing mode and the second processing mode from the plurality of processing modes based at least in part on the listening preference of the user.

Example 31: the system of example 30, wherein the listening preference comprises an enhanced speech intelligibility preference.

Example 32: the system of example 30, wherein the listening preference comprises a noise reduction preference.

Example 33: the system of example 30, wherein the listening preference comprises a bass boosting preference.

Example 34: the system of example 30, wherein the listening preference comprises an output-ambient sound balancing preference.

Example 35: a method comprising: determining, by a processing system, that a current acoustic environment of one or more hearing instruments is an acoustic environment in which a user may prefer either of a first processing mode and a second processing mode, wherein the one or more hearing instruments is configured to be worn in, on, or about an ear of the user; and based on the determination: applying, by the processing system, the first processing mode to generate a first output audio signal; applying, by the processing system, the second processing mode to generate a second output audio signal; outputting, via at least one of the one or more hearing instruments, sound based on the first output audio signal; after outputting the first output audio signal, outputting, via at least one of the one or more hearing instruments to output sound based on the second output audio signal; receiving, by the processing system, an indication of user input that identifies a selected output audio signal from among the first output audio signal and the second output audio signal, wherein a selected processing mode from among the first and second processing modes was applied to generate the selected output audio signal; and based on receiving the indication of user input that identifies the selected output audio signal: applying, by the processing system, the selected processing mode to generate a third output audio signal; and outputting, by the one or more hearing instruments, sound based on the third output audio signal.

Example 36: the method of example 35, further comprising: receiving, via the processing system, a first input audio signal from a first source; receiving, via the processing system, a second input audio signal from a second source, wherein applying the first processing mode to generate the first output audio signal comprises: applying, by the processing system, the first processing mode to generate the first output audio signal as a first mix of the first input audio signal and the second input audio signal, wherein a first set of parameter values defines the first mix of the first and second input audio signals, and wherein applying the second processing mode to generate the second output audio signal comprises: applying, by the processing system, the second processing mode to generate the second output audio signal as a second mix of the first input audio signal and the second input audio signal, wherein a second set of parameters values defines the second mix of the first and second input audio signals, the second mix being different from the first mix.

Example 37: the method of example 36, wherein: the first source comprises a microphone of the one or more hearing instruments and the second source comprises a telecoil of the one or more hearing instruments, the microphone is configured to generate the first input audio signal based on sounds in the current acoustic environment of the one or more hearing instruments; and the telecoil is configured to deter wireless signals modulated to carry the second input audio signal.

Example 38: the method of example 36, wherein: the first source comprises a microphone of the one or more hearing instruments and the second source comprises an electromagnetic radio of the one or more hearing instruments, the microphone is configured to generate the first input audio signal based on sounds in an acoustic environment of the one or more hearing instruments; and the electromagnetic radio is configured to detect wireless signals modulated to carry the second input audio signal.

Example 39: the method of any of examples 35-38, wherein the one or more hearing instruments comprise a first hearing instrument and a second hearing instrument, the method further comprising: outputting, via the first hearing instrument, the sound based on the first output audio signal; and outputting, via the second hearing instrument, the sound based on the second output audio signal.

Example 40: the method of any of examples 35-39, further comprising: determining, by the processing system, that the one or more hearing instruments are in a specific acoustic environment at a time that the processing system received the indication of user input; determining, by the processing system and at a time later than the time that the processing system received the indication of user input, that the one or more hearing instruments are again in the specific acoustic environment; and based on determining that the one or more hearing instruments are again in the specific acoustic environment: generating, by the processing system, a fourth output audio signal based on a mix of second subsequent portions of the first and second input audio signals, wherein the selected set of parameter values defines the mix of the second subsequent portions of the first and second input audio signals; and outputting, by the one or more hearing instruments, sound based on the fourth output audio signal.

Example 41: the method of example 40, wherein determining that the one or more hearing instruments are again in the specific acoustic environment comprises: applying, by the processing system, a machine learning model to determine that the one or more hearing instruments are in the specific acoustic environment.

Example 42: the method of any of examples 35-41, wherein receiving the indication of user input comprises: receiving, by the processing system, an indication of one or more of: a tapping gesture on the one or more hearing instruments, a voice instruction from the user, or a nodding gesture of a head of the user.

Example 43: the method of any of examples 35-42, wherein receiving the indication of user input comprises: receiving, by the processing system, the indication of user input from a user interface of an external computing device.

Example 44: the method of any of examples 35-43, wherein determining that the current acoustic environment of the one or more hearing instruments is an acoustic environment in which the user may prefer either of the first processing mode and the second processing mode comprises: sensing, by the processing system and via one or more sources in the one or more hearing instruments, input audio signals from an environment surround the user; determining, by the processing system and based on the sensed input audio signals, the current acoustic environment of the user; and selecting, by the processing system and based on the determined current acoustic environment, the first processing mode and the second processing mode from a plurality of processing modes.

Example 45: the method of example 44, wherein selecting the first processing mode and the second processing mode from the plurality of processing modes comprises: determining, by the processing system and based on the determined current acoustic environment, a listening preference of the user; and selecting, by the processing system, the first processing mode and the second processing mode from the plurality of processing modes based at least in part on the listening preference of the user.

Example 46: the method of example 45, wherein the listening preference comprises an enhanced speech intelligibility preference.

Example 47: the method of example 45, wherein the listening preference comprises an enhanced speech intelligibility preference.

Example 48: the method of example 45, wherein the listening preference comprises a bass boosting preference.

Example 49: the method of example 45, wherein the listening preference comprises an output-ambient sound balancing preference.

Example 50: The method of any of examples 35-49, wherein each of the one or more hearing instruments comprises a user interface, and wherein receiving the indication of user interface comprises: receiving, by the processing system and via the user interface, the indication of user input.

Example 51: The method of example 50, wherein the user interface comprises a tactile interface disposed on an outer surface of the hearing instrument, and wherein the indication of user input comprises tactile input received by the tactile interface.

Example 52: the method of any of examples 50 and 51, wherein the user interface comprises one or more sensors disposed within one of the one or more hearing instruments and configured to detect a predefined movement of a head of the user, and wherein the indication of user input comprises the rotation of the head of the user.

Example 53: the method of example 51, wherein the one or more sensors comprise one or more of an accelerometer, a gyroscope, or an inertial measurement unit (IMU).

Example 54: the method of any of examples 35-52, wherein the user interface comprises one or more sensors configured to detect user hand movement to the ear of the patient, and wherein the indication of user input comprises the user hand movement.

Example 55: the method of example 53, wherein the one or more sensors is configured to detect the user hand movement by detected, via a microphone within the one or more hearing instruments, changes in an acoustic feedback path to the one or more hearing instruments.

Example 56: a computer-readable medium comprising instructions that, when executed, cause a processing system of a hearing instrument system to perform the method of any of examples 35-55.

Various examples have been described. These and other examples are within the scope of the following claims.

What is claimed is:

1. A system comprising:

one or more hearing instruments configured to be worn in, on, or about an ear of a user; and a processing system configured to:

determine that a current acoustic environment of the one or more hearing instruments is an acoustic environment in which the user may prefer either of a first processing mode and a second processing mode; and based on the determination:

apply the first processing mode to generate a first output audio signal;

apply the second processing mode to generate a second output audio signal;

cause at least one of the one or more hearing instruments to output sound based on the first output audio signal;

after causing the one or more hearing instruments to output the first output audio signal, cause at least one of the one or more hearing instruments to output sound based on the second output audio signal;

receive an indication of user input that identifies a selected output audio signal from among the first output audio signal and the second output audio signal, wherein a selected processing mode from among the first and second processing modes was applied to generate the selected output audio signal; and based on receiving the indication of user input that identifies the selected output audio signal:

apply the selected processing mode to generate a third output audio signal; and cause the one or more hearing instruments to output sound based on the third output audio signal.

2. The system of claim 1, wherein:

the processing system is further configured to:

receive a first input audio signal from a first source; and receive a second input audio signal from a second source, the processing system is configured to, as part of applying the first processing mode to generate the first output audio signal, apply the first processing mode to generate the first output audio signal as a first mix of the first input audio signal and the second input audio signal, wherein a first set of parameter values defines the first mix of the first and second input audio signals, and the processing system is configured to, as part of applying the second processing mode to generate the second output audio signal, apply the second processing mode to generate the second output audio signal as a second mix of the first input audio signal and the second input audio signal, wherein a second set of parameter values defines the second mix of the first and second input audio signals, the second mix being different from the first mix.

3. The system of claim 2, wherein:

the first source comprises a microphone of the one or more hearing instruments and the second source comprises a telecoil of the one or more hearing instruments, the microphone is configured to generate the first input audio signal based on sounds in the current acoustic environment of the one or more hearing instruments, and the telecoil is configured to detect wireless signals modulated to carry the second input audio signal.

4. The system of claim 2, wherein:

the first source comprises a microphone of the one or more hearing instruments and the second source comprises an electromagnetic radio of the one or more hearing instruments, the microphone is configured to generate the first input audio signal based on sounds in the current acoustic environment of the one or more hearing instruments, and the electromagnetic radio is configured to detect wireless signals modulated to carry the second input audio signal.

5. The system of claim 1, wherein:

the one or more hearing instruments include a first hearing instrument and a second hearing instrument, and the processing system is configured to cause the first hearing instrument to output sound based on the first output audio signal and to cause the second hearing instrument to output sound based on the second output audio signal.

6. The system of claim 1, wherein the processing system is further configured to:

receive a first input audio signal from a first source;

receive a second input audio signal from a second source;

determine that the one or more hearing instruments are in a specific acoustic environment at a time that the processing system received the indication of user input;

determine, at a time later than the time that the processing system received the indication of user input, that the one or more hearing instruments are again in the specific acoustic environment; and based on determining that the one or more hearing instruments are again in the specific acoustic environment:

generating a fourth output audio signal based on a mix of the first and second input audio signals, wherein a set of parameter values associated with the selected processing mode defines the mix of the first and second input audio signals; and causing the one or more hearing instruments to output sound based on the fourth output audio signal.

7. The system of claim 1, wherein the processing system is configured to, as part of receiving the indication of user input, receive an indication of one or more of:

a tapping gesture on the one or more hearing instruments, a voice instruction from the user, a nodding gesture of a head of the user, a gesture of the user detected by a sensor of the system, wherein the sensor is in communication with the processing system, or an input by the user into a computing device in communication with the processing system.

8. The system of claim 1, wherein to determine that the current acoustic environment of the one or more hearing instruments is an acoustic environment in which the user may prefer either of the first processing mode and the second processing mode, the processing system is configured to:

sense, via one or more sources in the one or more hearing instruments, sounds from an environment surrounding the user;

determine, based on the sensed sounds, the current acoustic environment of the user; and select, based on the current acoustic environment, the first processing mode and the second processing mode from a plurality of processing modes stored in a memory of the system.

9. The system of claim 8, wherein to select the first processing mode and the second processing mode from the plurality of processing modes, the processing system is configured to:

determine, based on the current acoustic environment, a listening preference of the user; and selecting the first processing mode and the second processing mode from the plurality of processing modes based at least in part on the listening preference of the user.

10. The system of claim 9, wherein the listening preference comprises an enhanced speech intelligibility preference.

11. The system of claim 9, wherein the listening preference comprises a noise reduction preference.

12. The system of claim 1, wherein each of the one or more hearing instruments comprises a user interface, and wherein the processing system is configured to receive the indication of user input via the user interface, and wherein the user interface comprises one or more sensors disposed within one of the one or more hearing instruments and configured to detect a rotation of a head of the user, and wherein the indication of user input comprises a predefined movement of the head of the user.

13. A system comprising:
a first hearing instrument configured to be worn in, on, or about a first ear of a user;
a second hearing instrument configured to be worn in, on, or about a second ear of the user; and
a processing system configured to:
determine that a current acoustic environment of the first hearing instrument and the second hearing instrument is an acoustic environment in which the user may prefer either of a first processing mode and a second processing mode; and
based on the determination:
apply the first processing mode to generate a first output audio signal;
apply the second processing mode to generate a second output audio signal;
cause the first hearing instrument to output sound based on the first output audio signal and the second hearing instrument to output sound based on the second output audio signal;
receive an indication of user input that identifies a selected output audio signal from among the first output audio signal and the second output audio signal; wherein a selected processing mode from among the first and second processing modes was applied to generate the selected output audio signal; and
based on receiving the indication of user input that identifies the selected output audio signal:
apply the selected processing mode to generate a third output audio signal; and
cause both the first hearing instrument and the second hearing instrument to output sound based on the third output audio signal.

14. The system of claim 13, wherein:
the processing system is configured to:
receive a first input audio signal from a first source; and
receive a second input audio signal from a second source,
wherein the processing system is configured to, as part of applying the first processing mode, to:
generate the first output audio signal; and
apply the first processing mode to generate the first output audio signal as a first mix of the first input audio signal and the second input audio signal, wherein a first set of parameter values defines the first mix of the first and second input audio signals,
wherein the processing system is configured, as part of applying the second processing mode to generate the second output audio signal, to:
generate the second output audio signal; and
apply the second processing mode to generate the second output audio signal as a second mix of the first input audio signal and the second input audio signal, wherein a second set of parameter values defines the second mix of the first and second input audio signals, the second mix being different from the first mix.

15. The system of claim 14, wherein:
the first source comprises a microphone in at least one of the first hearing instrument or the second hearing instrument,
the second source comprises a telecoil of at least one of the first hearing instrument or the second hearing instrument,
the microphone is configured to generate the first input audio signal based on sounds in the current acoustic environment surrounding at least one of the first hearing instrument or the second hearing instrument, and
the telecoil is configured to detect wireless signals modulated to carry the second input audio signal.

16. The system of claim 15, wherein:
the first source comprises a microphone in at least one of the first hearing instrument or the second hearing instrument,
the second source comprises an electromagnetic radio of at least one of the first hearing instrument or the second hearing instrument,
the microphone is configured to generate the first input audio signal based on sounds in the current acoustic environment, and
the electromagnetic radio is configured to detect wireless signals modulated to carry the second input audio signal.

17. The system of claim 13, wherein the processing system is configured to cause the first hearing instrument to output the sound based on the first output audio signal and to cause the second hearing instrument to output the sound based on the second output audio signal simultaneously.

18. The system of claim 13, wherein the processing system is further configured to:
receive a first input audio signal from a first source;
receive a second input audio signal from a second source;
determine that the first hearing instrument and the second hearing instrument are in a specific acoustic environment at a time that the processing system received the indication of user input;
determine, at a time later than the time that the processing system received the indication of user input, that the first hearing instrument and the second hearing instrument are again in the specific acoustic environment; and
based on determining that the first hearing instrument and the second hearing instrument are again in the specific acoustic environment:
generating a fourth output audio signal based on a mix of the first and second input audio signals, wherein a set of parameter values associated with the selected processing mode defines the mix of the first and second input audio signals; and
causing the first hearing instrument or the second hearing instrument to output sound based on the fourth output audio signal.

19. A method comprising:
determining, by a processing system, that a current acoustic environment of one or more hearing instruments is an acoustic environment in which a user may prefer either of a first processing mode and a second processing mode, wherein the one or more hearing instruments is configured to be worn in, on, or about an ear of the user; and
based on the determination:

applying, by the processing system, the first processing mode to generate a first output audio signal;

applying, by the processing system, the second processing mode to generate a second output audio signal;

outputting, via at least one of the one or more hearing instruments, sound based on the first output audio signal;

after outputting the first output audio signal, outputting, via at least one of the one or more hearing instruments to output sound based on the second output audio signal;

receiving, by the processing system, an indication of user input that identifies a selected output audio signal from among the first output audio signal and the second output audio signal, wherein a selected processing mode from among the first and second processing modes was applied to generate the selected output audio signal; and based on receiving the indication of user input that identifies the selected output audio signal:

applying, by the processing system, the selected processing mode to generate a third output audio signal; and outputting, by the one or more hearing instruments, sound based on the third output audio signal.

20. The method of claim 19, further comprising:

receiving, via the processing system, a first input audio signal from a first source;

receiving, via the processing system, a second input audio signal from a second source, wherein applying the first processing mode to generate the first output audio signal comprises:

applying, by the processing system, the first processing mode to generate the first output audio signal as a first mix of the first input audio signal and the second input audio signal, wherein a first set of parameter values defines the first mix of the first and second input audio signals, and wherein applying the second processing mode to generate the second output audio signal comprises:

applying, by the processing system, the second processing mode to generate the second output audio signal as a second mix of the first input audio signal and the second input audio signal, wherein a second set of parameters values defines the second mix of the first and second input audio signals, the second mix being different from the first mix.

* * * * *